(12) United States Patent
Ohsono et al.

(10) Patent No.: US 6,839,395 B2
(45) Date of Patent: Jan. 4, 2005

(54) CASK AND PRODUCTION METHOD FOR CASK

(75) Inventors: Katsunari Ohsono, Hyogo (JP); Toshihiro Matsuoka, Hyogo (JP); Suguru Hode, Hyogo (JP); Shinji Ookame, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/239,631

(22) PCT Filed: Nov. 14, 2001

(86) PCT No.: PCT/JP01/09957
§ 371 (c)(1),
(2), (4) Date: Mar. 10, 2003

(87) PCT Pub. No.: WO02/059904
PCT Pub. Date: Aug. 1, 2002

(65) Prior Publication Data
US 2004/0062338 A1 Apr. 1, 2004

(30) Foreign Application Priority Data
Jan. 25, 2001 (JP) .......................................... 2001-17663

(51) Int. Cl.[7] .............................................. G21C 19/00
(52) U.S. Cl. ................... 376/272; 250/506.1; 220/4.04; 220/678
(58) Field of Search ....................... 376/272; 250/506.1, 250/507.1; 220/4.01, 4.04, 4.11, 677–680

(56) References Cited

U.S. PATENT DOCUMENTS 3,851,179 A  * 11/1974 Irvine ......................... 250/506
3,930,166 A  * 12/1975 Bochard ...................... 250/506
4,244,482 A  *  1/1981 Baumgart et al. ............. 220/3
4,590,383 A     5/1986 Machado et al.
5,063,299 A    11/1991 Efferding
6,064,711 A  *  5/2000 Copson ....................... 376/272
6,187,395 B1 *  2/2001 Canzler et al. ............... 376/272
6,193,848 B1 *  2/2001 Shockley et al. ............. 202/108
6,195,404 B1 *  2/2001 Lemogne et al. ............. 376/272
6,389,093 B1 *  5/2002 Gluschke et al. ............. 376/272
6,438,190 B2 *  8/2002 Gluschke et al. ............. 376/260

FOREIGN PATENT DOCUMENTS

JP          100200/1980         7/1980
JP          113597/1985         8/1985

(List continued on next page.)

OTHER PUBLICATIONS

Kunio Maruoka: "Spent–fuel storage container by Mitsubishi Heavy Industries, Ltd." Nikkan Kogyo Syuppan Production, Nuclear Viewpoints, vol. 44, No. 4, pp. 38–39 Apr. 1, 1998.

*Primary Examiner*—Harvey E. Behrend
(74) *Attorney, Agent, or Firm*—Oblon, Spivak, McClelland, Maier & Neustadt, P.C.

(57) ABSTRACT

Heat conductive fins are welded along both sides of a belt-like member with a margin left along edges of the both sides, thereby to form a unit. The unit is welded to a body with the heat conductive fins from the outside of each fin. Next, another belt-like member is covered over a gap between adjacent belt-like members, and these members are welded from the outside. With this arrangement, there is no need to weld in a narrow and long space and the entire welding step is carried out from the outside, which makes it easier to assemble a cask.

12 Claims, 34 Drawing Sheets

FOREIGN PATENT DOCUMENTS

| | | |
|---|---|---|
| JP | 62-242725 | 10/1987 |
| JP | 63-159798 | 7/1988 |
| JP | 02-024599 | 1/1990 |
| JP | 02-098700 | 4/1990 |
| JP | 04-036697 | 2/1992 |
| JP | 4-357498 | 12/1992 |
| JP | 09-054192 | 2/1997 |
| JP | 9-159796 | 6/1997 |
| JP | 9-171094 | 6/1997 |
| JP | 2001-133590 | 5/2001 |
| JP | 2001-201589 | 7/2001 |
| JP | 2001-201595 | 7/2001 |
| JP | 2001-235583 | 8/2001 |
| JP | 2001-318187 | 11/2001 |
| WO | 95/20459 | 8/1995 |

\* cited by examiner

FIG.30
(a) 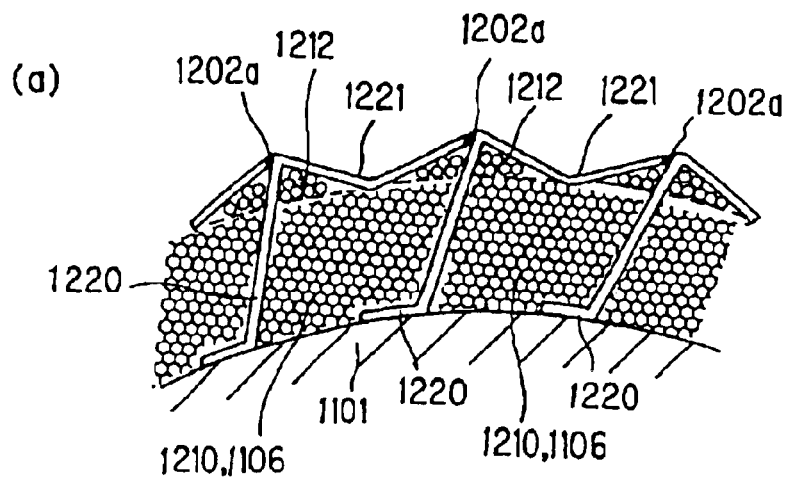
(b) 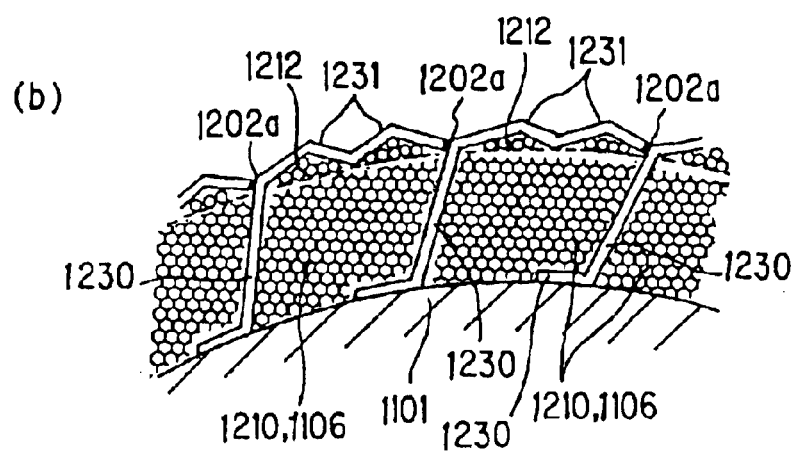
(c) 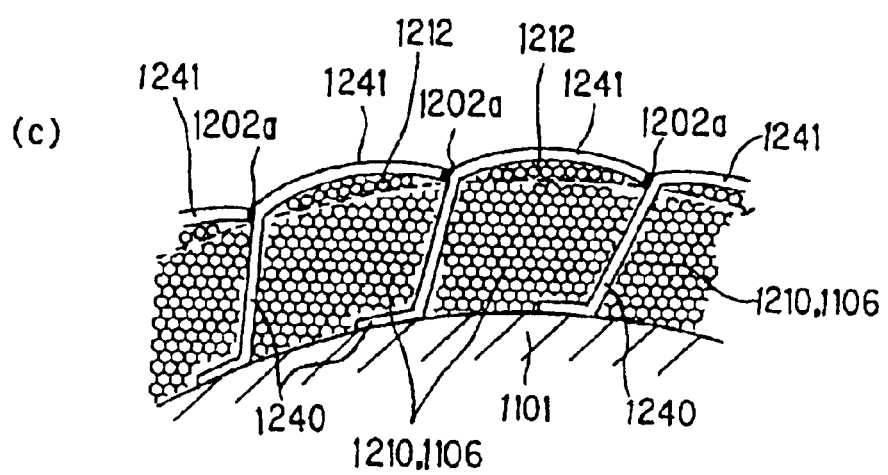

FIG.38
(a)
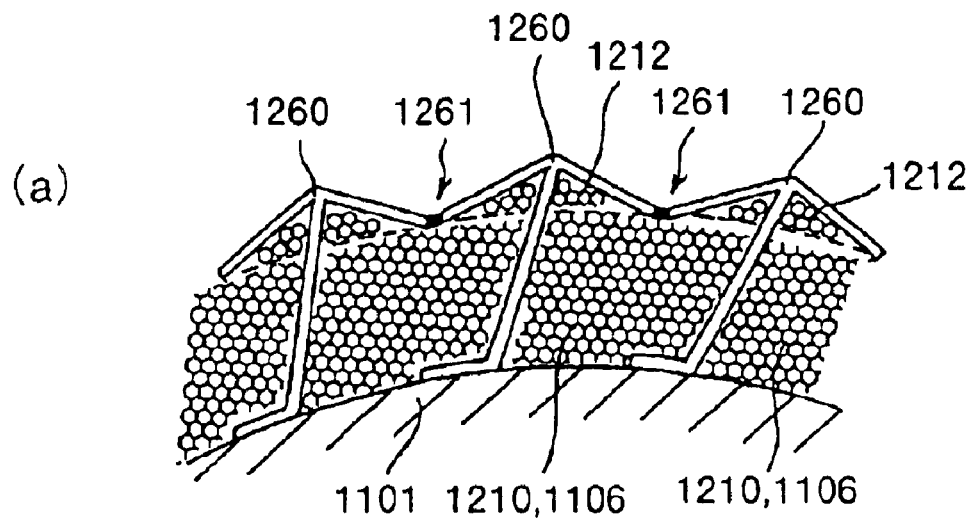
(b)
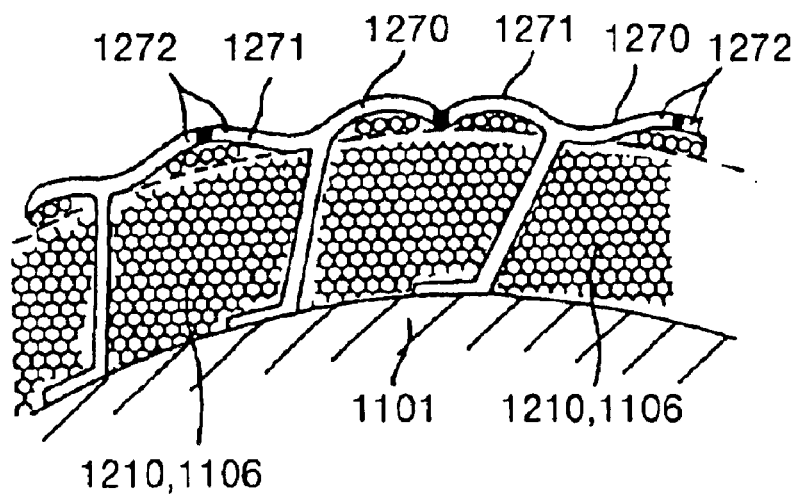

US 6,839,395 B2

CASK AND PRODUCTION METHOD FOR CASK

TECHNICAL FIELD

The present invention relates to a cask that accommodates and stores spent fuel assemblies after finishing combustion and whose assembly is easily performed, and a method of manufacturing the cask.

BACKGROUND ART

A nuclear fuel assembly that is at its end period of a nuclear fuel cycle, finishes its combustion, and cannot be used any more, is called spent nuclear fuel. The spent nuclear fuel containing high radioactive materials such as FP requires thermal cooling, and is, therefore, cooled at a cooling pit of a nuclear power plant for a predetermined period of time (one to three years). Then, the spent nuclear fuel is accommodated in a cask as a shielding container, and the cask is conveyed to a reprocessing facility by track or the like, and is stored there. Each spent fuel assembly is inserted into each cell of a basket installed in the cask, thereby to secure proper holding force against vibration during the transportation.

There are various kinds of casks disclosed as conventional examples in "Nuclear Eye (in Japanese), Nikkan Kogyo Syuppan Production, issued on Apr. 1, 1998, and Japanese Patent Application Laid-open No. 62-242725. A cask that has been helpful for developing the present invention will be explained below. The following contents will be shown only for the sake of convenience of explanation, and do not mean known or public contents.

FIG. 39 is a perspective view which shows one example of a cask. FIG. 40 is a cross-sectional view of the cask shown in FIG. 39 in its axial direction. The cask 500 is constructed of a cylindrical body 501, a resin 502 as a neutron shield provided on the external periphery of the body 501, external cylinder 503 thereof, a bottom section 504, and a lid section 505. The body 501 and the bottom section 504 are made of carbon steel as a gamma-ray shield by forging. The lid section 505 consists of a primary lid 506 and a secondary lid made of stainless steel or the like. The body 501 and the bottom section 504 are connected together by butt welding. The primary lid 506 and the secondary lid 507 are fixed to the body 501 with bolts made of stainless steel or the like. A metallic O-Ring is provided between the lid section 505 and the body 501, thereby to keep the internal side of the body airtight.

A plurality of heat conductive fins 508 are provided between the body 501 and the external cylinder 503 to carry out thermal conduction. In order to increase thermal conductivity, copper is used as the material of the heat conductive fins 508. The resin 502 is injected into a space formed between the heat conductive fins 508 in a fluid status, and is cooled and fixed. A basket 509 has a structure having 69 angular pipes 510 collected in a flux shape as shown in FIG. 26, and is inserted into a cavity 511 of the body 501 so as to be restrained within the cavity 511.

The angular pipes 510 are made of aluminum alloy mixed with a neutron absorber (boron: B) to avoid the inserted spent fuel assemblies from reaching a critical state. At both sides of a body 512 of a cask, trunnions 513 are provided (one is omitted) to suspend the cask 500. Further, buffers 514 having wood built inside as a buffer material are fitted (one is omitted) at both ends of the cask body 512.

In the cask 500, the heat conductive fins 508 are welded to the body 501, the external cylinder 503 is disposed around the fins, and welding is carried out from the inside of the external cylinder. However, since the cask 500 has a height of about 6 m and the space formed between the external cylinder 503 and the heat conductive fins 508 is extremely narrow and long, it is extremely difficult to manually carry out welding. Therefore, in the current status, an exclusive self-run welding machine is manufactured, and the welding machine must be run in the space to carry out welding by remote control. Consequently, there has been a problem that the welding operation is troublesome. Particularly, when only a traditional welding machine exists in an assembling plant, it is difficult to assemble the cask. As the introduction of an exclusive welding machine and a technical guidance become necessary, the assembling can be carried out at only a specific assembling plant. This problem becomes serious in foreign countries where the assembling technique has not been developed.

This invention has been achieved in order to solve the above problem, and it is a first object of the invention to provide a cask whose assembly is easily carried out and a method of manufacturing the cask.

Next problems of the conventional cask are as follows. FIG. 41 is a structural diagram which shows one example of the conventional cask. FIG. 42 is a cross-sectional view of the cask shown in FIG. 41 in its axial direction. In this cask 1500, a spent fuel assembly is accommodated in a stainless body 1501 that shields the gamma ray (not shown) Around the external periphery of the body 1501, a plurality of stripes 1502 are welded in a radial shape. These stripes 1502 have their cross sections bent in an approximately v shape, and have their side edges 1521 welded to the body 1501, with the other side edges 1522 welded to bent lines 1523 formed at corners of adjacent stripes 1502. In order to discharge decay heat conducted from the body 1501, the stripes 1502 are constructed of a material having good thermal conductivity, for example, copper plates or the like. A space formed between the stripes 1502 is filled with a resin 1503 to absorb neutron.

A fin 1504 for heat radiation is welded to the outside of each stripe 1502. This fin 1504 has a comb shape and has its tooth surface formed in a curvature. The decay heat of the spent fuel assemblies is first transmitted to the body 1501. As the stripes 1502 have been welded to this body 1501, the decay heat is conducted from this body 1501 to the stripes 1502, and is then discharged to the outside through the externally exposed surface of the stripes 1502 and the fins 1504.

However, according to the above conventional cask 1500, as the stripes 1502 have the fins 1504 welded, there has been a problem that the temperature is distributed over the external surface, and it is not possible to radiate heat uniformly. In other words, the temperature distribution occurs in such a manner that portions of junction with the fins 1504 have a high temperature, and the stripes 1502 between the fin 1504 and the fin 1504 have a low temperature. This has not been desirable in terms of heat radiation efficiency. This invention has been made in the light of the above aspect, and it is a second object of the invention to provide a cask capable of improving the heat radiation efficiency.

DISCLOSURE OF THE INVENTION

In order to achieve the above objects, the cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that a plurality of belt-like members A and B are welded along edges of the members, the heat conductive fins are welded along both sides of one belt-like member A with a margin left along edges of the both sides, and another belt-like member B adjacent to the belt-like member A is welded near the respective edges.

As the heat conductive fins are welded along both sides of the belt-like member A with a margin left along edges of the both sides, it is possible to separate the welded joints between the belt-like member A and the belt-like member B from the welded joints between the heat conductive fin and the belt-like member A, by welding the belt-like members A and B together near the edges thereof. With this arrangement, it is possible to prevent local concentration of thermally influenced sections.

The cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that belt-like members A and B are welded along edges of the members, a unit is structured by welding the heat conductive fins along both sides of one belt-like member A with a margin left along edges of the both sides, the unit is welded to the body with the heat conductive fins from the outside of the unit and is arranged at predetermined intervals, and another belt-like member B is covered over a gap between the belt-like member A and the belt-like member A of adjacent units and is welded from the outside.

According to this cask, at the time of welding the belt-like member with the heat conductive fins, and at the time of welding the belt-like member to the body with the heat conductive fins in a unit status, it is possible to carry out the entire welding step from the outside that is open, without welding in a narrow and long space. Further, as the heat conductive fins are welded along both sides of the belt-like member A with a margin left along edges of the both sides, it is possible to separate the welded joints between the belt-like member A and the belt-like member B from the welded joints between the heat conductive fin and the belt-like member A, by welding the belt-like members A and B together near the edges thereof. Therefore, it is possible to prevent local concentration of thermally influenced sections. The cask includes the case in which the belt-like member A is welded after the heat conductive fins are welded to the body, and the case in which the heat conductive fins are first welded to the belt-like member A and then the unit is welded to the body (hereinafter the same). Covering another belt-like member B includes the case in which the belt-like member B is fitted in a gap between the belt-like members A and A, and the case in which the edge of the belt-like member B is superimposed on the edge of the belt-like member A.

The cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that belt-like members A and B are welded along edges of the members, a unit is structured by welding the heat conductive fin along an approximately central part of one belt-like member A, the unit is welded to the body with the heat conductive fins and is arranged at predetermined intervals, and another belt-like member B is covered over a gap between the belt-like member A and the belt-like member A of adjacent units and is welded from the outside of the member B.

At the time of welding the belt-like member with the heat conductive fins, and at the time of welding the belt-like member to the body with the heat conductive fins in a unit status, it is possible to carry out the entire welding step from the outside, without welding in a narrow and long space. Further, by welding the heat conductive fin along an approximately central part of the belt-like member A, it is possible to separate the welded joints between the belt-like member A and the belt-like member B from the welded joints between the heat conductive fin and the belt-like member A. Therefore, it is possible to prevent local concentration of thermally influenced sections.

The cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that a plurality of belt-like members A are welded along edges of the members, the heat conductive fin is welded along an approximately central part of the belt-like member A, the heat conductive fin is welded to the body from one side of the fin, and adjacent belt-like members A are welded near the edges of the members.

At the time of welding the belt-like member with the heat conductive fins, and at the time of welding the belt-like member A to the body with the heat conductive fins, it is possible to carry out the entire welding step from the outside that is open, without welding in a narrow and long space. Further, by welding the heat conductive fin along an approximately central part of the belt-like member A, it is possible to separate the welded joints between the belt-like members A from the welded joints between the heat conductive fin and the belt-like member A. Therefore, it is possible to prevent local concentration of thermally influenced sections.

In the cask of this invention based on the above cask, the belt-like members are formed in an angular shape or a valley shape by bending. By forming the belt-like members in the angular shape or the valley shape by bending, the surface area of the external cylinder increases. Therefore, heat radiation efficiency is improved.

In the cask of this invention based on the above cask, the heat conductive fin is fixed diagonally with respect to a radial direction of the cask. As the heat conductive fins are fixed diagonally with respect to the radial direction, it is possible to restrict the neutron from the spent fuel assemblies accommodated in the cask to pass through the heat conductive fins.

In the cask of this invention based on the above cask, the heat conductive fin is bent in an L shape or a U shape in its cross sections, and is in surface contact with the belt-like members.

The decay heat generated from the spent fuel assemblies within the cask is conducted from the body to the heat conductive fins, and is finally radiated from the external cylinder to the outside. The heat conductive fins are usually made of steel having high thermal conductivity, and on the other hand, the external cylinder is made of stainless or carbon steel in order to keep strength. Therefore, the heat conductive fins are bent in the L shape or the U shape in their cross sections, thereby to bring the heat conductive fins into surface contact with the belt-like members, and secure thermal conduction from the heat conductive fins to the external cylinder. With this arrangement, it is possible to improve the thermal conductivity of the cask.

The cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that a belt-like member A having an angular shape or a valley shape in its cross section is covered over external edges of adjacent heat conductive fins, and contacting edges of adjacent belt-like members A are welded.

At the time of welding the heat conductive fins to the belt-like member A, and at the time of welding the belt-like member with the heat conductive fins, it is possible to carry out the entire welding step from the outside that is open, without welding in a narrow and long space.

In the cask of this invention based on the above cask, the adjacent belt-like members are coupled to each other along ends of the members With this arrangement, it becomes easy to handle the belt-like members. Therefore, it is possible to assemble the cask easily.

The cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that a plurality of ring sheets are welded in an axial direction of the cylinder, a unit is structured by welding a ring-shaped heat conductive fin along an approximately central part of an internal surface of the ring sheet, the unit is welded to the body with the heat conductive fin from one side of the fin, and contacting edges of adjacent ring sheets are welded from the outside of the ring sheet.

According to this cask, at the time of welding the ring sheet with the heat conductive fins, and at the time of welding the ring sheet to the body with the heat conductive fins in a unit status, it is possible to carry out the entire welding step from the outside that is open, without welding in a narrow and long space. Further, by welding the heat conductive fin along an approximately central part of the ring sheet, it is possible to separate the welded joints between the ring sheets from the welded joints between the heat conductive fin and the ring sheet. Therefore, it is possible to prevent local concentration of thermally influenced sections.

The cask of this invention comprises a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder. The external cylinder has a structure that ring sheets A and B are welded in an axial direction of the cylinder, a unit is structured by welding ring-shaped heat conductive fins to both sides of one ring sheet A with a margin left along edges of the both sides, the unit is welded to the body with the heat conductive fins from the outside of the unit and is arranged at predetermined intervals, and another ring sheet B is disposed between the ring sheet A and the ring sheet A of adjacent units and is welded from the outside.

According to this cask, at the time of welding the ring sheet with the heat conductive fins, and at the time of welding the ring sheet to the body with the heat conductive fins in a unit status, it is possible to carry out the entire welding step from the outside that is open, without welding in a narrow and long space. Further, as the heat conductive fins are welded to both sides of the ring sheet A with a margin left along edges of the both sides, it is possible to separate the welded joints between the ring sheet A and the ring sheet B from the welded joints between the heat conductive fin and the ring sheet A, by welding the ring sheet A and the ring sheet B near the edges thereof. Therefore, it is possible to prevent local concentration of thermally influenced sections.

In the cask of this invention based on the above cask, the unit and/or the ring sheet B is obtained by dividing the unit and/or the sheet into parts in a circumferential direction of the cask and welding these parts together.

By dividing the ring sheet in the circumferential direction, it is possible to assemble the ring sheets by fitting them from both sides of the body, without the necessity of inserting the ring sheets from an axial direction of the body. Therefore, it is possible to assemble the cask easily.

In the cask of this invention based on the above cask, the neutron absorber provided in the space formed with the heat conductive fins and the external cylinder is a molded resin formed along the shape of the space.

In the above cask, the external cylinder has a split-type structure and is assembled while sequentially welding divided parts. Particularly, in a case of welding the ring sheets by laminating them in an axial direction of the cask, the space between the external cylinder and the heat conductive fins is closed. Therefore, if the molded resin formed in the shape of the space is used, it is possible to dispose the resin while assembling the external cylinder.

In the cask of this invention based on the above cask, for welding the heat conductive fins to the body made of steel, a bulge portion made of iron is provided on the body, and the heat conductive fin made of copper is welded to the bulge portion.

In this cask, at the time of directly fixing heat conductive fins made of copper to the body, the weldability of the fins is not satisfactory. Therefore, the bulge portion made of iron is once provided on the body. Based on this presence, fine cracks that occur during the welding are accommodated in the bulge portion, and the body can be prevented from being affected by the cracks.

The cask of this invention comprises a heat conductive fin and an external cylinder that are divided into a plurality of units. Each unit is connected around an external periphery of a body of the cask, and adjacent external cylinders are then connected together so as to enable heat conduction.

Therefore, it is possible to assemble the cask easily.

The cask of this invention comprises an external cylinder formed with a plurality of units that are disposed around an external periphery of a body of the cask. Each of the units is integrally formed with a heat conductive fin and a wall of a part of the external cylinder in advance, and the heat conductive fins, the body, and adjacent walls of the external cylinder are connected together to enable heat conduction. Therefore, it is possible to assemble the cask easily.

The cask of this invention comprises a body having a cavity that accommodates fuel assemblies, a basket formed with sheet members that partition inside the cavity in a lattice shape, heat conductive plates provided on end surfaces of the sheet member that are in contact with the cavity, and a plurality of units each of which is integrally formed with a heat conductive fin connected to an external periphery of the body and an external cylinder covering over the external periphery of the body. Therefore, it is possible to assemble the cask easily. Further, the heat conductive plates can increase thermal conductivity.

The method of manufacturing a cask of this invention comprises a step of forming a unit by welding heat conductive fins along both sides of a belt-like member A with a margin left along edges of the both sides, a step of welding a plurality of the units to a body of the cask with the heat conductive fins from the outside of each of the units, and a step of fitting a belt-like member B into a gap between the belt-like member A and an adjacent belt-like member A, and welding along contacting edges of the belt-like members A and B from the outside.

According to this method of manufacturing the cask, first, the belt-like member A and the heat conductive fins are welded to provide a unit, thereby to facilitate the welding work. On the other hand, the belt-like member A may be welded after the heat conductive fins are welded to the body. However, in this case, the welding is carried out from the rear side of the belt-like member A, and therefore, the work becomes slightly complicated (hereinafter the same). The latter method may be used for the cask.

For welding the units to the body, the welding is carried out from the outside of the units. At the time of welding the belt-like member B by fitting it in a gap between the belt-like members A, the welding is carried out from the outside. With this arrangement, it is not necessary to carry out the welding using an exclusive welding machine in a narrow and long space like the conventional practice, and it is possible to carry out the entire welding step from the outside. Therefore, it is possible to assemble the cask easily. Particularly, in a foreign country where the assembling technique has not been developed, it becomes possible to assemble the cask using the existing ordinary welding technique.

The method of manufacturing a cask of this invention comprises a step of forming a unit by welding a heat conductive fin along an approximately central part of a belt-like member A, a step of welding at least two units to a body of the cask with the heat conductive fin by arranging the units at predetermined intervals, and a step of covering another belt-like member B over a gap between the belt-like member A and the belt-like member A of adjacent units and welding the belt-like member B from the outside.

According to this method of manufacturing the cask, first, the belt-like member A and the heat conductive fins are welded to provide a unit, thereby to facilitate the welding work. Next, the units are welded to the body with the heat conductive fins. As the cross section of the unit has a T shape, both sides of the unit are open, and therefore, it is possible to carry out the welding work from the outside. Further, at the time of welding the belt-like member B by covering it over a gap between the belt-like members A and A, the welding is carried out from the outside. With this arrangement, it is not necessary to carry out the welding using an exclusive welding machine in a narrow and long space like the conventional practice, and it is possible to carry out the entire welding step from the outside. Therefore, it is possible to assemble the cask easily.

The method of manufacturing a cask of this invention comprises a step of welding a heat conductive fin along an approximately central part of a belt-like member A, a step of welding the belt-like member A to a body of the cask with the heat conductive fin from an open side of the fin, and a step of welding a next belt-like member A to the body with a heat conductive fin from an open side of the fin, and welding adjacent belt-like members A together along contacting edges of the members A.

According to this method of manufacturing the cask, first, the belt-like member A and the heat conductive fins are welded, thereby to facilitate the work. Next, the belt-like members A are welded to the body with the heat conductive fins. As the cross section of the belt-like member A has a T shape, both sides of the fin are open, and therefore, it is possible to carry out the welding work from the outside. Further, at the time of welding the belt-like members A and A together, the welding is carried out from the outside. With this arrangement, it is not necessary to carry out the welding using an exclusive welding machine in a narrow and long space like the conventional practice, and it is possible to carry out the entire welding step from the outside. Therefore, it is possible to assemble the cask easily.

The method of manufacturing a cask of this invention comprises a step of forming a unit by welding a ring-shaped heat conductive fin along an approximately central part of the internal surface of a ring sheet A, a step of welding the unit to a body of the cask with the heat conductive fin in an axial direction of the cask from an open side of the fin, and a step of welding a next unit to the body with the heat conductive fin in the axial direction from an open side of the fin, and welding contacting edges of adjacent ring sheets A together from the outside.

According to this method of manufacturing the cask, first, the ring sheet A and the heat conductive fins are welded to provide a unit, thereby to facilitate the welding work. Next, the units are welded to the body with the heat conductive fins. As the cross section of the unit has a T shape, both sides of the fine are open, and therefore, it is possible to carry out the welding work from the outside. Further, at the time of welding the ring sheets A together, the welding is carried out from the outside. With this arrangement, it is not necessary to carry out the welding using an exclusive welding machine in a narrow and long space like the conventional practice, and it is possible to carry out the entire welding step from the outside. Therefore, it is possible to assemble the cask easily.

The method of manufacturing a cask of this invention comprises a step of forming a unit by welding a ring-shaped heat conductive fin along an approximately central part of an internal surface of a ring sheet A, a step of welding the unit to a body of the cask with the heat conductive fin in an axial direction of the cask from an open side of the fin, a step of accommodating approximately a half of a molded resin formed in a ring shape into the unit, and a step of welding a next unit to the body with a heat conductive fin in the axial direction from an open side of the fin, welding contacting edges of adjacent ring sheets A together from the outside, and accommodating a remaining half of the formed molded resin in the unit.

According to this method of manufacturing the cask, the ring sheet A and the heat conductive fins are welded to provide a unit, and the units are welded to the body with the heat conductive fins, in a similar manner to the above. Therefore, it is possible to carry out the welding work from the outside in an open status. Then, in a status that a molded resin formed in a ring shape is accommodated in the unit, a next unit is welded from the outside, the molded resin is accommodated into the unit, and the edges of adjacent ring sheet A are welded together from the outside. With this arrangement, it is not necessary to carry out welding using an exclusive welding machine in a narrow and long space like the conventional practice, and it is possible to carry out the entire welding step from the outside. Therefore, it is possible to assemble the cask easily.

The method of manufacturing a cask of this invention comprises a step of forming a unit by welding ring-shaped heat conductive fins along both sides of one ring sheet A with a margin left along edges of the both sides, a step of welding at least two units to the body with the heat conductive fins in an axial direction of the cask from the outside of the units by arranging the units at predetermined intervals, and a step of disposing another ring sheet B in a gap between the ring sheet A and the ring sheet A of adjacent units and welding the ring sheet B from the outside.

According to this method of manufacturing the cask, first, the ring sheet A and the heat conductive fins are welded to provide a unit, thereby to facilitate the welding work. Next, the units are welded to the body with the heat conductive fins. As the cross section of the unit has a T shape, both sides of the fin are open, and therefore, it is possible to carry out the welding work from the outside. Further, at the time of welding the ring sheet B by covering it over a gap between the ring sheets A and A, the welding is carried out from the outside. With this arrangement, it is not necessary to carry out the welding using an exclusive welding machine in a narrow and long space like the conventional practice, and it is possible to carry out the entire welding step from the outside. Therefore, it is possible to assemble the cask easily.

The method of manufacturing a cask of this invention comprises a step of forming a unit by welding ring-shaped heat conductive fins along both sides of one ring sheet A with a margin left along edges of the both sides, a step of accommodating a ring-shaped resin into the unit, a step of welding at least two units to a body of the cask with the heat conductive fins in an axial direction of the cask from the outside of the units by arranging the units at predetermined intervals, a step of disposing a resin molded in a ring-shape into between adjacent units, and a step of covering another ring sheet B over a gap between the ring sheet A and the ring sheet A of adjacent units and welding the ring sheet B from the outside.

According to this cask, the ring sheet A and the heat conductive fins are welded to provide a unit, and the units are welded to the body with the heat conductive fins, in a similar manner to the above. Therefore, it is possible to carry out the welding work from the outside in an open status. At this time, the molded resin formed in a ring shape is accommodated within the unit. While the molded resin is formed in a ring shape, this may be in an integrated structure or in a split-type structure obtained by dividing the resin in a circumferential direction of the cask. In the case of an integrated structure, the resin may be molded within the unit, or the molded resin may be disposed in advance at the time of welding the heat conductive fins. In the case of the split-type structure, the molded resin may be fixed to the body in advance and accommodated in the unit at the time of welding the unit, or may be sequentially accommodated into the units after the units are formed.

At least two units are welded to the body in an axial direction of the cask from the outside of the units at predetermined intervals. At this time, a resin is disposed in a similar manner to the above. Further, a molded resin is disposed between adjacent units. The ring sheet B is covered over a gap between the ring sheet A and the ring sheet A of the adjacent units and is welded from the outside. With this arrangement, it is not necessary to carry out the welding using an exclusive welding machine in a narrow and long space like the conventional practice, and it is possible to carry out the entire welding step from the outside. Further, the resin is easily arranged. As a result, it is possible to assemble the cask easily.

In the method of manufacturing a cask of this invention based on the method of manufacturing the cask, the unit and/or the ring sheet B has a structure obtained by being divided into parts in a circumferential direction of the cask, and these parts are individually welded to the body.

By dividing the unit and/or the ring sheet B in the circumferential direction, it is possible to fix the unit and the ring sheet B to the body from its side face. Further, it is easy to arrange a molded resin within the unit and between the units. Therefore, it is possible to assemble the cask easily.

The cask of this invention comprises a body internally provided with a basket that accommodates radioactive materials such as spent fuel assemblies, and a plurality of sheet members provided around the body. A part of each of the members is in contact with the body, another part of the member constitutes an external surface of the cask and forms a single or plural angular-shaped portions or valley-shaped portions, and still another part of the member is connected to an adjacent sheet member, and a neutron absorber is filled in a space formed with the sheet members. Decay heat from the spent fuel assemblies is conducted from the body to the sheet members, and is radiated from the external surface of the cask. As the angular-shaped portion or the valley-shaped portion is formed on the external surface of the cask, the heat radiation area increases as compared with that of a conventional cask that is simply formed in a cylindrical external shape. Consequently, heat radiation is efficiently performed. The sheet members may be manufactured by bending plate materials, or may be manufactured by extrusion.

Particularly, by combining the neutron absorber with a honeycomb member, and by bringing the honeycomb member into contact at least with the body, it is possible to carry out heat conduction via the honeycomb member even when the thermal conductivity of the neutron absorber is low. Further, by combining the neutron absorber with a plurality of heat conductors, it is also possible to improve the thermal conductivity.

The honeycomb member or the heat conductor is made of aluminum or copper, and the sheet member is made of iron, copper, or aluminum. With this arrangement, it is possible to provide the honeycomb member or the heat conductor with a main heat conduction function, and provide the sheet members with strength. In order to further improve the thermal conductivity, it is possible to adhere a copper plate, an aluminum plate, or a graphite sheet onto a single side or both sides of the sheet member. In this case, the use of the honeycomb member or the heat conductor is not essential.

Further, it is also possible to improve the thermal conductivity by allowing a part of the sheet member contacting the body or a part of the copper or aluminum plate to be in surface contact with the body.

This cask comprises a basket that is provided with cells where spent fuel assemblies are accommodated and has an approximately octagonal external shape, a body that accommodates the basket with its external shape and internal shape formed to match the basket, and shields a gamma ray, and a neutron shield externally provided around the body. With this arrangement, it is possible to ensure a thickness of the body that is thick enough to shield the gamma ray, and it is possible to lighten the cask. Further, by provided the neutron shield so as to be an octagonal shape with respect to the body, it is possible to reduce the neutron shield.

Further, the cask comprises a body internally provided with a basket that accommodates radioactive materials such as spent fuel assemblies, a plurality of sheet members provided around the body, with a part of each of the members being in contact with the body, another part of the member constituting an external surface of the cask, and still another part of the member being connected to an adjacent sheet member, and a heat good conductor that is adhered to the sheet member and has an extension section that reaches to contact the body. Therefore, it is possible to improve the thermal conductivity and radiate heat efficiently.

Furthermore, the cask comprises a body internally provided with a basket that accommodates radioactive materials such as spent fuel assemblies, and a plurality of sheet members provided around the body, with a part of each of the members being in contact with the body, another part of the member constituting an external surface of the cask, and still another part of the member being connected to an adjacent sheet member. The sheet member further includes a fitting section with the body, and an intermediate member connected to the fitting section. The fitting section has higher weldability with respect to the body than other portions of the sheet member, and the intermediate member has higher thermal conductivity than other portions of the sheet member. Therefore, it is possible to improve weldability and improve heat conduction of the sheet members. Further, it is possible to improve the thermal conductivity, which makes it possible to radiate heat efficiently.

Furthermore, the cask comprises a body internally provided with a basket that accommodates radioactive materials such as spent fuel assemblies, and a plurality of sheet members provided around the body, with a part of each of the members being in contact with the body, another part of the member constituting an external surface of the cask, and still another part of the member being connected to an adjacent sheet member. The sheet member includes a portion that functions as a heat conductive fin and a portion that functions as an external cylinder, the portions being made of different materials from each other. Thermal conductivity of the portion that functions as the heat conductive fin is relatively high, and heat resistance of the portion that functions as the external cylinder is relatively high. Therefore, it is possible to improve the thermal conductivity and radiate heat efficiently. Further, it is possible to provide heat resistance to the members.

Furthermore, the cask comprises a body internally provided with a basket that accommodates radioactive materials such as spent fuel assemblies, and a plurality of sheet members provided around the body, with a part of each of the members being in contact with the body, another part of the member constituting an external surface of the cask, and still another part of the member being connected to an adjacent sheet member. The sheet member further includes a fitting section with the body, and the fitting section has higher weldability with respect to the body than other portions of the sheet member. Therefore, it is possible to improve the thermal conductivity, and it becomes possible to easily weld the sheet members to the body.

BRIEF DESCRIPTION OF THE DRAWINGS

FIG. 30 is an explanatory view which shows sheet members,

FIG. 38 is an explanatory view which shows a modification of sheet members.

BEST MODE FOR CARRYING OUT THE INVENTION

Embodiments of the cask according to this invention will be explained in detail below with reference to the drawings. This invention is not limited by these embodiments. Further, it is needless to mention that constituent elements of this invention include those that persons skilled in the art can easily assume.

Figure 1:
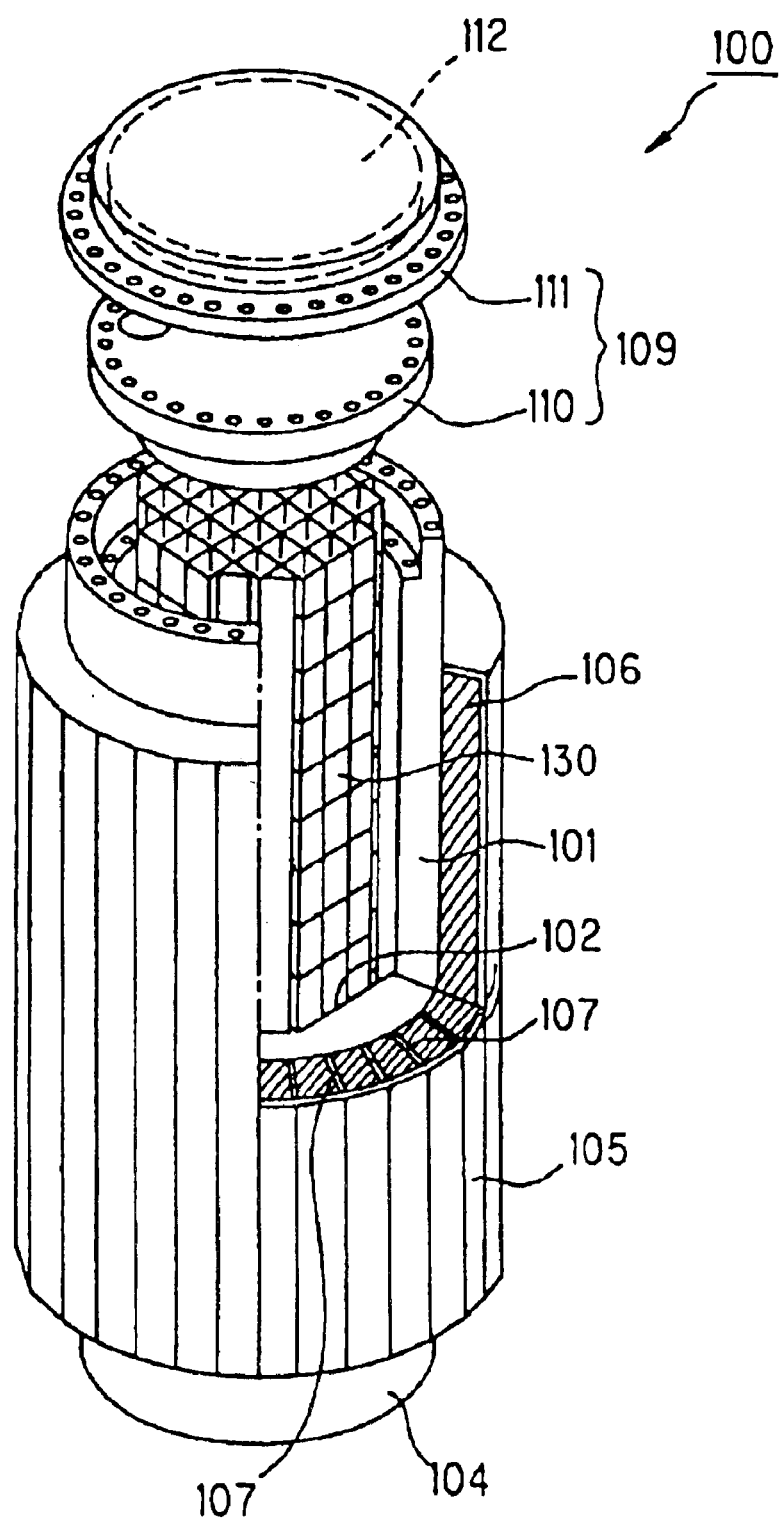
FIG. 1 is a perspective view which shows a cask according to a first embodiment of this invention.
Figure 2:
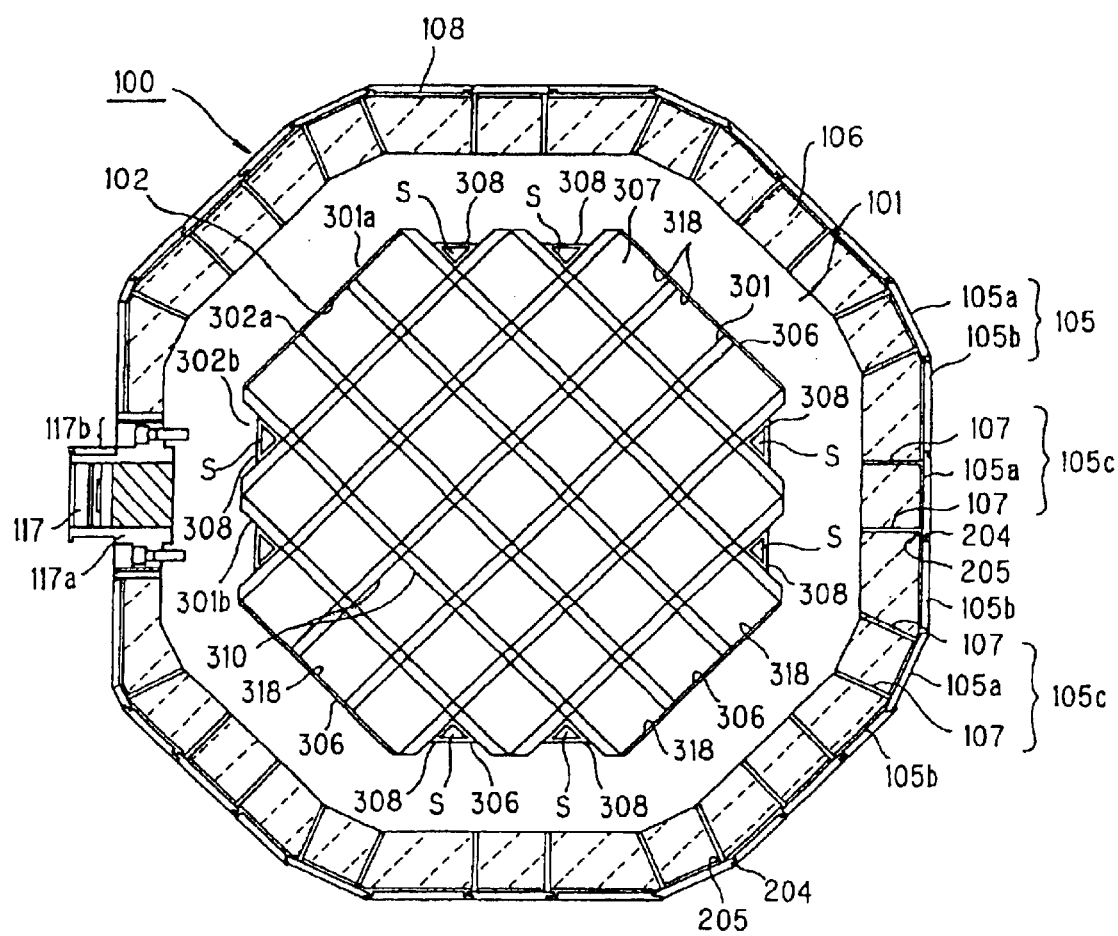
FIG. 2 is a cross-sectional view of the cask shown in FIG. 1 in its radial direction.

First Embodiment:

FIG. 1 is a perspective view which shows a cask according to the first embodiment of this invention. FIG. 2 is a cross-sectional view of the cask shown in FIG. 1 in its radial direction. A cask 100 according to this first embodiment is machined so as to have the internal surface of a cavity 102 of a body 101 matched with an external peripheral shape of a basket 130. The internal surface of the cavity 102 is machined by milling with an exclusive machining apparatus to be described later. The body 101 and a bottom plate 104 are forged using carbon steel having a gamma-ray shielding function. It is possible to use stainless steel instead of carbon steel. The body 101 and the bottom plate 104 are connected together by welding. In order to secure sealing performance of a pressure-resistant vessel, a metallic gasket is provided between a primary lid 110 and the body 101.

A resin 106 that is a polymer material containing much hydrogen and has a neutron shielding function is filled between the body 101 and an external cylinder 105. Further, a plurality of copper heat conductive fins 107 that carry out heat conduction are welded between the body 101 and the external cylinder 105. The resin 106 is injected in a fluid status into each space formed between the heat conductive fins 107, and is cooled and hardened. A honeycomb unit made of aluminum or copper may be disposed within the space, and a neutron shield may be charged into the honeycomb by pressure (not shown). It is preferable that the heat conductive fins 107 are provided in high density in sections having a high quantity of heat in order to radiate heat uniformly. An allowance 108 for heat expansion of a few millimeters is provided between the resin 106 and the external cylinder 105.

A lid section 109 is constructed of a primary lid 110 and a secondary lid 111. This primary lid 110 is a disk made of stainless steel or carbon steel that shields the gamma ray. The secondary lid 111 is also a disk made of stainless steel or carbon steel that shields the gamma ray. A resin 112 is sealed as a neutron shield in the upper surface of this secondary lid 111. The primary lid 110 and the secondary lid 111 are fitted to the body 101 with bolts made of stainless or carbon steel. Further, a metallic gasket is proved between the primary lid 110 and the secondary lid 111 and the body 101 respectively, thereby to hold internal air tightness of the cask. At both sides of the cask body, trunnions 117 are provided to suspend the cask 100.

Figure 3:
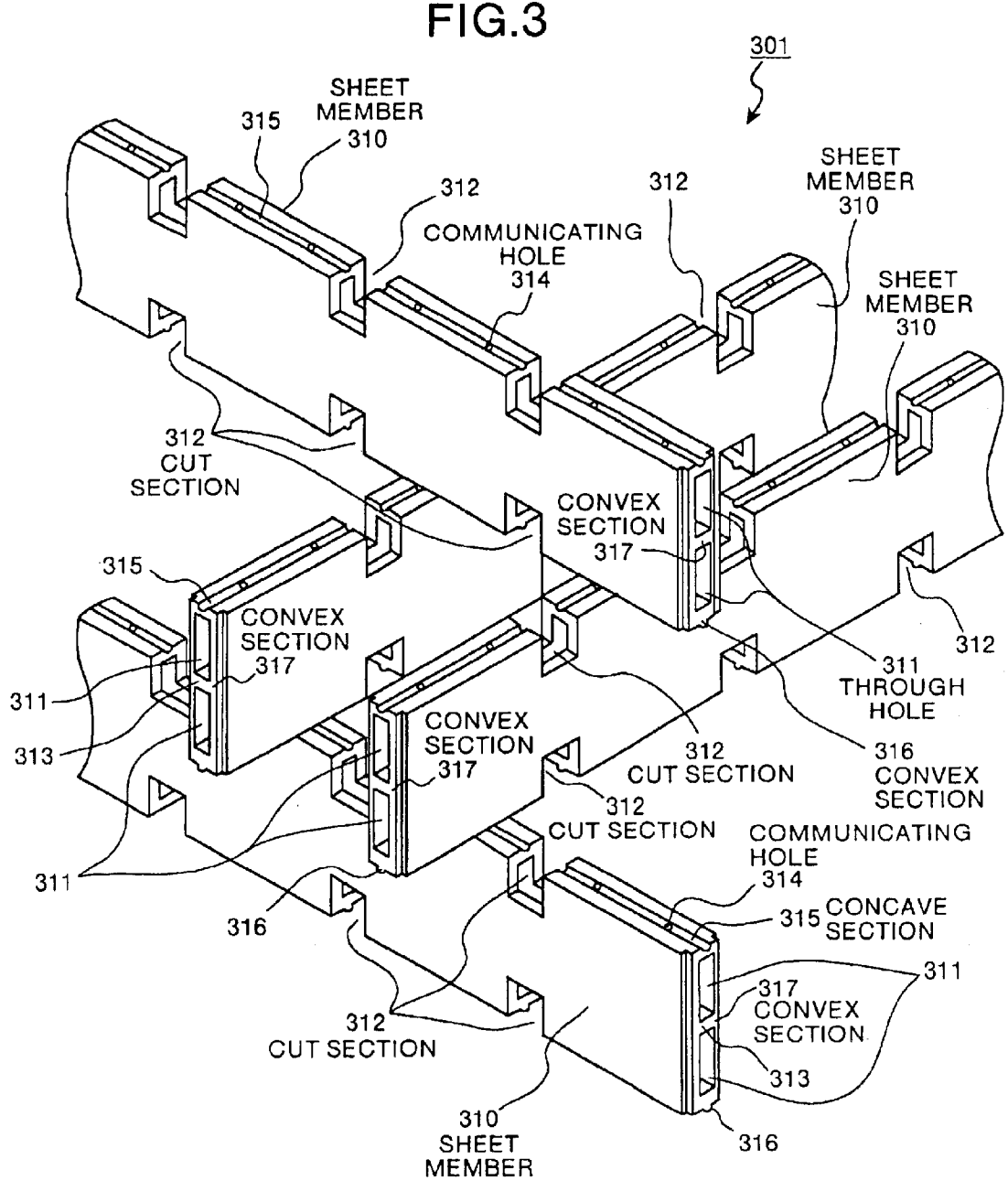
FIG. 3 is an explanatory view which shows a structure of a basket.

The internal shape of the cavity 102 matches the external shape of the basket 130. FIG. 3 is an explanatory view which shows a structure of the basket. This basket 301 is structured by providing a cut section 312 in a belt-like sheet member 310 having a through hole 311, and by intersecting the sheet members 310 at right angles to alternately superposing the intersecting members on each other. Based on this structure, cells 307 that accommodate spent fuel assemblies are formed. The through hole 311 is formed in a character B-like shape in its cross section in a longitudinal direction of the sheet member 310, and a plurality of communicating holes (not shown) are formed in a central rib 313 between the through holes. The through hole 311 is communicated to the through hole 311 of another sheet member 310 at the cut section 312. Further, on the end surface of the sheet member 310 in its longitudinal direction, a communicating hole 314 is provided to communicate between the through holes 311 of upper and lower sheet members 310.

Figure 4:
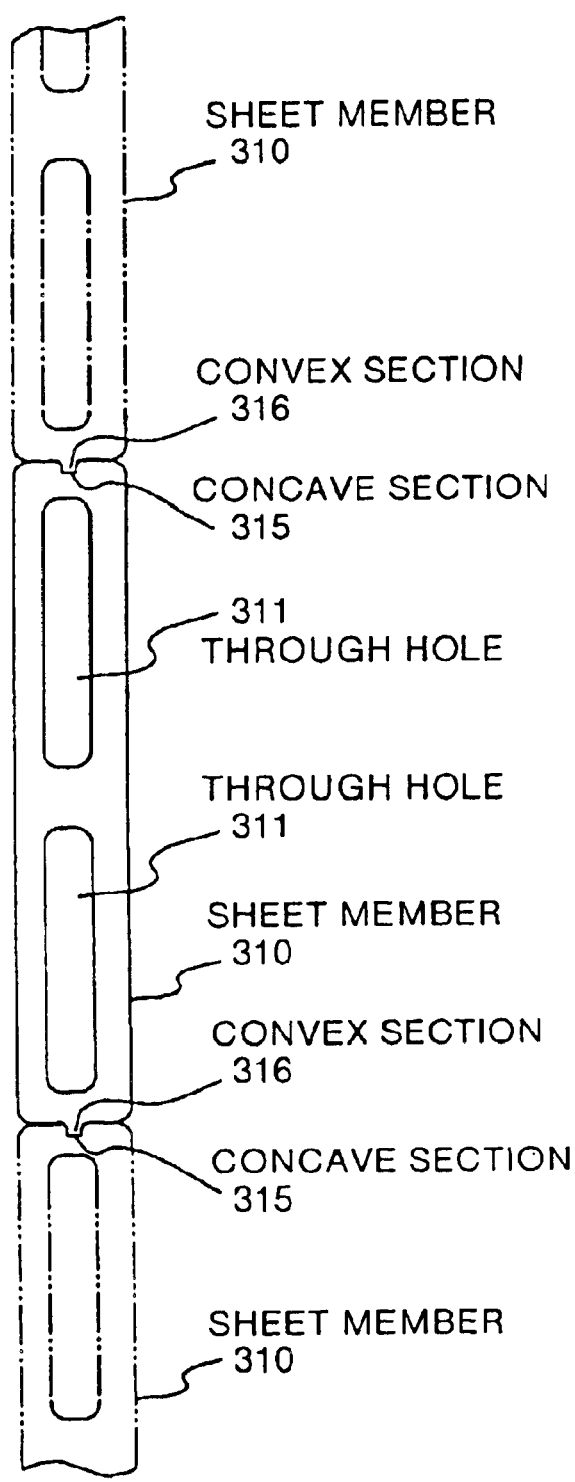
FIG. 4 is an explanatory view which shows a structure of a basket.

A concave section 315 and a convex section 316 are formed at upper and lower edges of the sheet member 310. The upper and lower sheet members 310 are positioned together with the concave section 315 and the convex section 316 (refer to FIG. 4). This avoids the occurrence of stages within the cells 307. Therefore, it is possible to smoothly accommodate the spent fuel assemblies within the cells 307. Further, a convex section 317 is formed at the edge of the sheet member 310.

Figure 5:
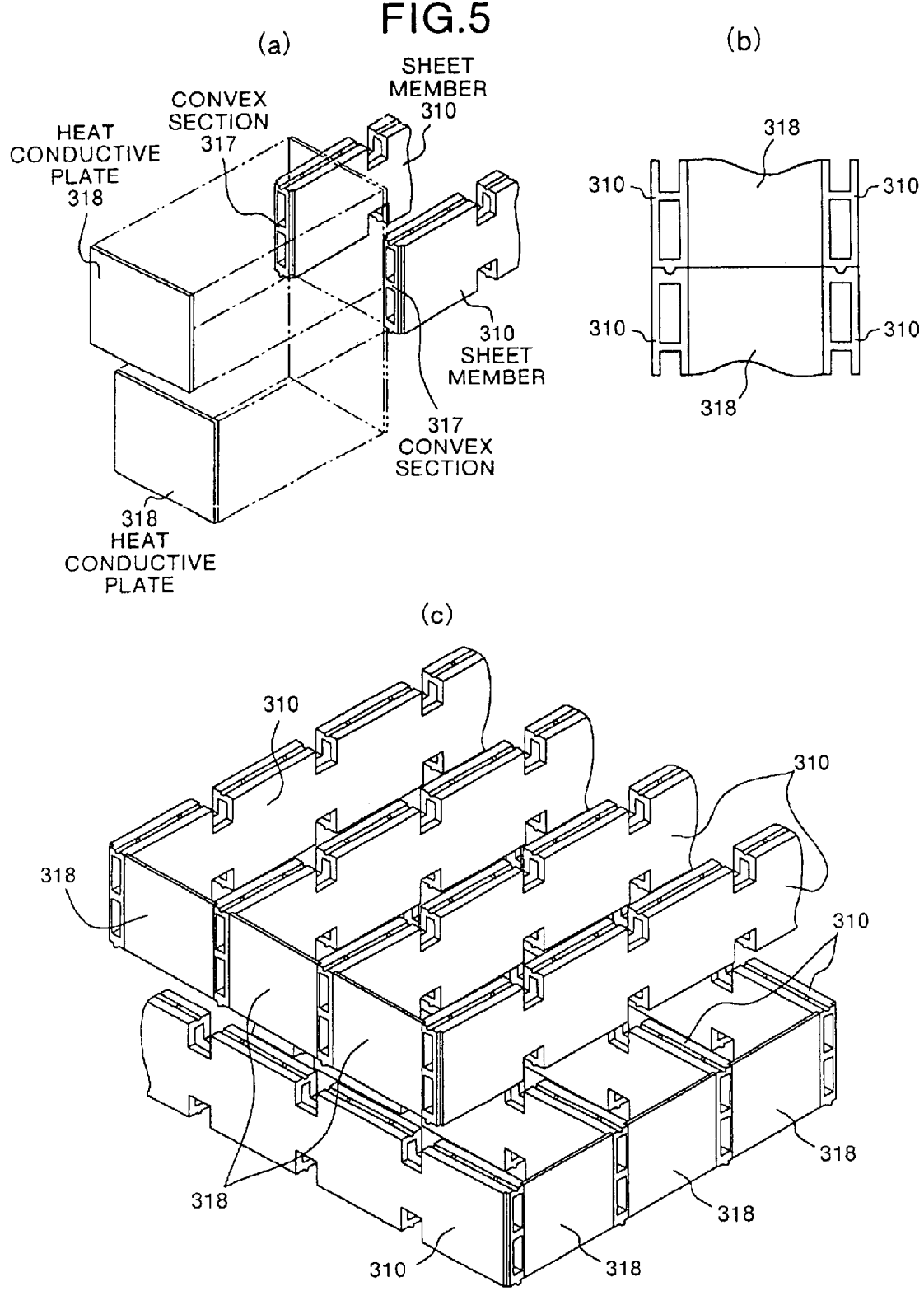
FIG. 5 is an explanatory view which shows a structure of a basket.

As a stage is formed at the edge of the sheet member 310 by providing the convex section 317, a heat conductive plate 318 is covered over a gap between the adjacent stages, as shown in FIG. 5(a). Based on this, the external peripheral surface of the basket 130 is formed. Aluminum or aluminum alloy added with boron is used for the material of the sheet members 310 and the heat conductive plates 318. A system of fitting the heat conductive plates 318 is not limited to the system of providing the convex sections 317 as shown in this drawing. For example, the heat conductive plates 318 may be fixed by spot welding by applying the heat conductive plates 318 over the edges of the sheet members 310 (not shown). Further, the heat conductive plates 318 may be fitted for each sheet member 310 as shown in FIG. 5(b), instead of providing the heat conductive plates 318 over the upper and lower sheet members 310. With this arrangement, it is possible to form the basket 130 by providing the sheet member 310 as a small assembling block for each stage and laminating these blocks together, as shown in FIG. 5(c).

Therefore, the blocks can be easily inserted into the cavity while the basket 130 can be also easily extracted.

The external shape of the basket 130 becomes such that its four surfaces 301a are formed in one plane according to the heat conductive plates 318, and other four surfaces 301b are formed in angular cross-sectional shape. The internal shape of the cavity 102 is formed in one plane so as to keep in approximately close contact with the one plane section (301a) of the basket 130. A section corresponding to the angular cross-sectional section (301b) of the basket approximately matches this shape, by leaving a space S at each corner section. Next, a dummy pipe 318 having a triangle in its cross section is inserted into this space S. With this dummy pipe 308, it becomes possible to reduce the weight of the body 302 and make uniform the thickness of the body 302. Further, it is possible to insure a good fit of the basket 130 with respect to the cavity by minimizing rattle.

When the inside of the dummy pipe 308 is sealed, pure water is prevented from permeating the dummy pipe 308 when the pure water is poured into a storage facility. Therefore, there is an effect of reducing the weight of the cask. Further, by sealing the inside of the dummy pipe 308, it is also possible to fill other material into the inside. For example, by filling helium gas into the inside in advance, it is possible to facilitate the helium gas introduction work when the cask is stored. Further, by sealing helium gas inside, it is possible to improve the thermal conductivity during the storage time. When helium gas is to be introduced, it is preferable to provide a valve on one of the lids.

The trunnions 117 are fixed directly to the body 101. In this case, the trunnions 117 are preferably fixed to the angular cross-sectional sections 301b of the body 101. As the angular cross-sectional sections 301b have slightly larger allowance than the one plane section 301a in the thickness of the body 101, there is small influence from the viewpoint of shielding the gamma ray even when the trunnion base is machined. While the resin 117a is filled in the trunnions 117, it is possible to prevent the transmission of neutron from sections 117b of the trunnions 117 where no resin is filled, by filling the resin into the dummy pipes 308 provided in the space S.

Figure 6:
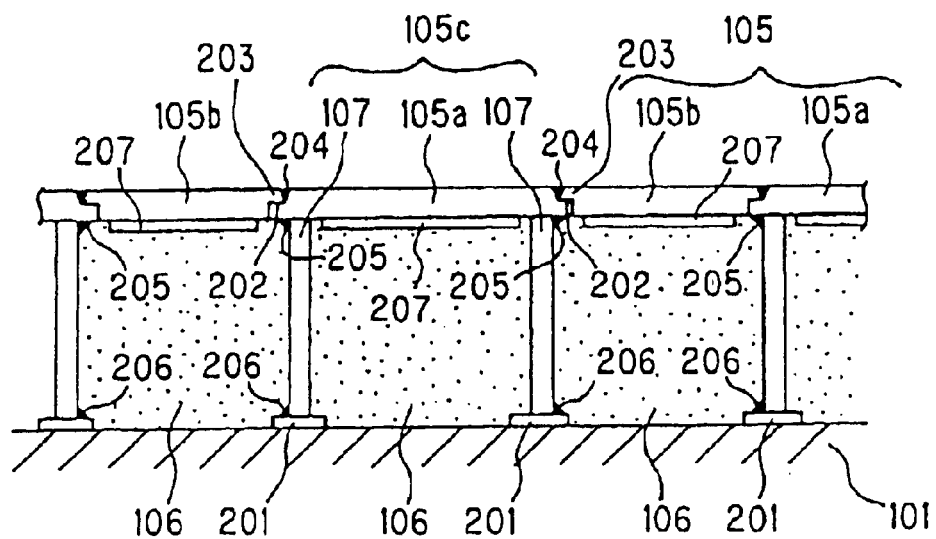
FIG. 6 is a detailed explanatory view which shows a structure of an external cylinder and heat conductive fins.

FIG. 6 is a detailed explanatory view which shows a structure of the external cylinder and heat conductive fins. This external cylinder 105 has a split-type structure consisting of belt-like members 105a and 105b. Both edges of the belt-like member 105a are left as they are, and the heat conductive fins 107 are welded at both sides of the belt-like member 105a (welded joints 205) except for the both edges, and have their cross sections in a gateway shape. The heat conductive fins 107 are welded to bulge portions 201 on the surface of the body 101 (welded joints 206). The bulge portions 201 are made of iron, and this improves weldability with the heat conductive fins 107 made of copper. The belt-like member 105a and the heat conductive fins 107 and 107 are formed in a unit 105c having a U-shaped cross section, and these units are welded on the surface of the body 101 at predetermined intervals.

Figure 7:
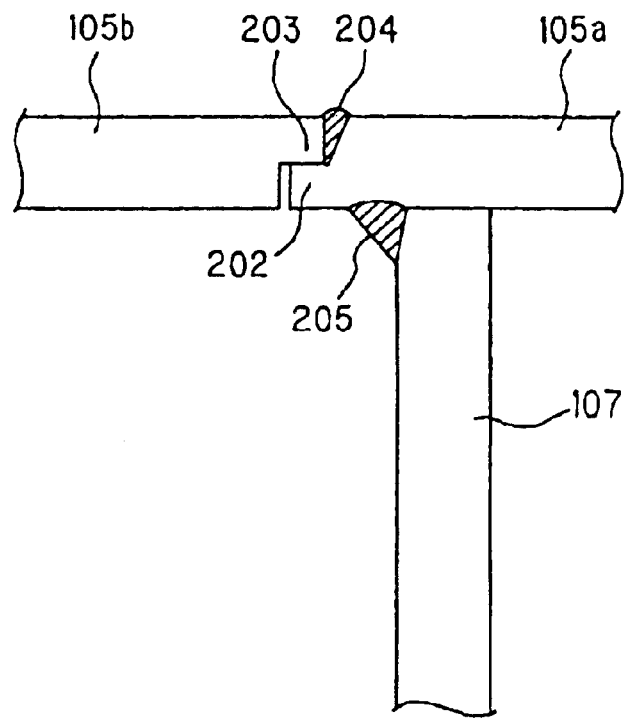
FIG. 7 is an enlarged view of a welded portion shown in FIG. 6.

FIG. 7 is an enlarged view of the welded portions shown in FIG. 6. Stage sections 202 are formed at both edges of the belt-like member 105a. A stage section 203 of the belt-like member 105b is engaged with one of the stage sections 202, and is welded (welded joints 204). Further, as is clear from this drawing, the welded joints 204 between the belt-like members 105a and 105b and the welded joints 205 between the heat conductive fin 107 and the belt-like member 105a are spaced from each other to some extent. With this arrangement, it is possible to prevent local concentration of thermally influenced sections. Accordingly, it is possible to prevent a thermal deformation of the external cylinder 105 and the heat conductive fins 107, and to relax internal stress. For the welding, a conventional welding method such as the TIG welding and the MIG welding can be used. A honeycomb member 207 made of aluminum is fixed to the inside of the external cylinder 105 to form a void layer.

Figure 8:
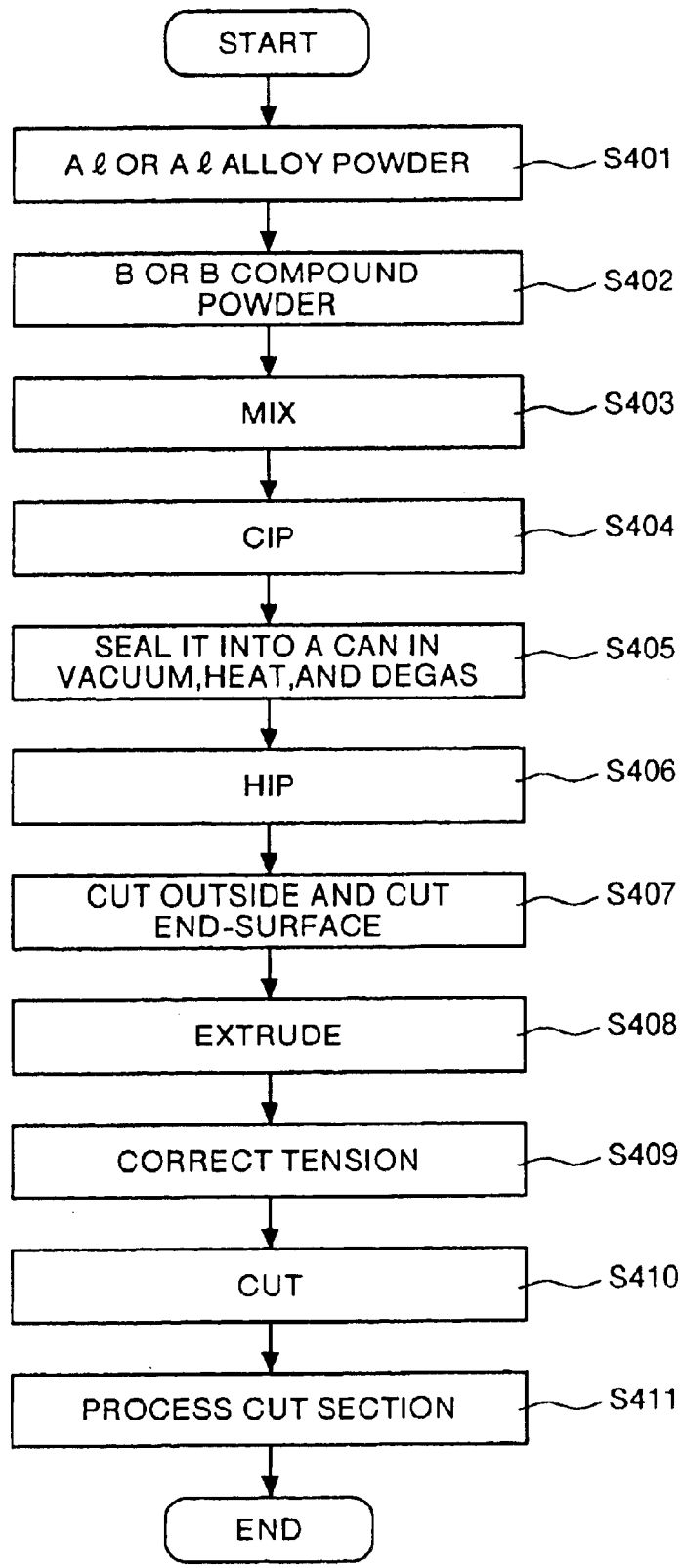
FIG. 8 is a flowchart which shows a method of manufacturing sheet members that constitute a basket.

FIG. 8 is a flowchart which shows a method of manufacturing sheet members that constitute the basket. First, powder of Al or Al alloy is manufactured using a rapid freezing method like the atomizing method (step S401), powder of B or B compound is prepared (step S402), and these particles are mixed for 10 to 15 minutes with a cross rotary mixer or the like (step S403).

For the Al or Al alloy, it is possible to use pure aluminum ground metal, Al—Cu base aluminum alloy, Al—Mg base aluminum alloy, Al—Mg—Si base aluminum alloy, Al—Zn—Mg base aluminum alloy, and Al—Fe base aluminum alloy. For the above B and B compound, it is possible to use B4C, B2O3, or the like. It is preferable that the quantity of boron added to aluminum is not less than 1.5 weight % and not more than 7 weight %. This is because it is not possible to obtain sufficient neutron absorbing performance at 1.5 weight % or below, and stretch based on tension is lowered at 7 weight % or above.

Mixed powder is sealed into a rubber case, and a high pressure is applied uniformly from all directions at a normal temperature according to the CIP (Cold Isostatic Press), thereby to carry out a powder molding (step S404). Molding conditions of the CIP are set such that the molding pressure is 200 MPa, the diameter of the molded product is 600 mm, and the length is 1500 mm. By uniformly applying pressure from all directions according to the CIP, it is possible to obtain a high-density molded product with small variations in the molding density.

The powder-molded product is sealed into a can in vacuum, and the temperature is raised to 300° C. (step S405). A gas component and a water component within the can are removed in this degassing step. At the next step, the vacuum degassed molded product is remolded according to the HIP (Hot Isostatic Press) (step S406). Molding conditions of the HIP are set such that the temperatures are 400° C. to 450° C., the time is 30 sec, the pressure is 6000 tons, and the diameter of the molded product is 400 mm. Next, in order to remove the can, the outside cutting and the end-surface cutting are carried out (step S407), and a billet as the molded product is hot excluded using a porthole extruder (step S408) Extrusion conditions in this case are set such that the heating temperatures are 500° C. to 520° C., and the extrusion speed is 5 m/min. These conditions are appropriately changed depending on the contained quantity of B. Next, after the extrusion, the tension is corrected (step S409), and non-stationary sections and evaluation sections are cut, to obtain the sheet member 310 (step S410). Next, a plurality of cut sections 312 are formed on the sheet member 310 by machining (step S411).

Figure 9:
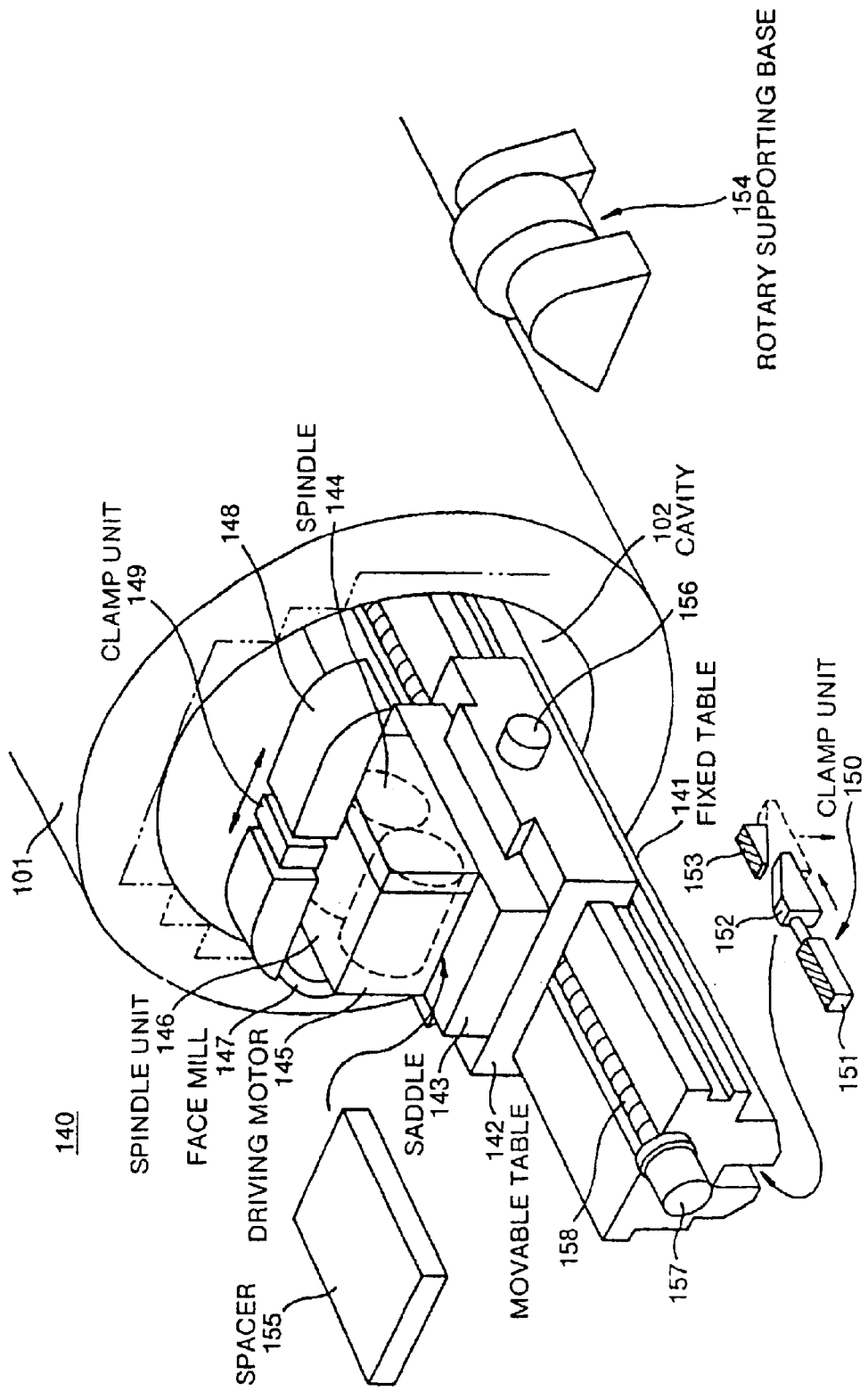
FIG. 9 is a schematic perspective view which shows a machining apparatus of a cavity.

The machining of the cavity 102 of the body 101 will be explained below. FIG. 9 is a schematic perspective view which shows a machining apparatus of the cavity 102. This machining apparatus 140 comprises a fixed table 141 that extends along the inside of the body 101 and is mounted and fixed within the cavity 102, a movable table 142 that slides on the fixed table 141 in an axial direction, a saddle 143 that is positioned and fixed on the movable table 142, a spindle unit 146 that is provided on the saddle 143 and includes a spindle 144 and a driving motor 145, and a face mill 147 provided on a spindle axis. A reaction force receiver 148 that has a contact section formed along the internal shape of the cavity 102 is provided on the spindle unit 146. This reaction force receiver 148 is detachable and slides along a dovetail groove (not shown) in arrow directions in the figure. The reaction force receiver 148 has a clamp unit 149 for the spindle unit 146, and can be fixed at a predetermined position.

A plurality of clamp units 150 are fixed to within a lower groove of the fixed table 141. Each of the clamp unit 150 is composed of a hydraulic cylinder 151, a wedge-like moving block 152 provided on the shaft of the hydraulic cylinder 151, and a fixed block 153 that is brought into contact with the moving block 152 on a sloped surface. The clamp unit 150 is fixed at its shaded side in the figure, to the internal side of the groove of the fixed table 141. When the shaft of the hydraulic cylinder 151 is driven, the moving block 152 is brought into contact with the fixed block 153, and moves slightly downward due to the effect of wedge (shown by a dotted line in the figure). With this arrangement, the lower surface of the moving block 152 is pressed against the internal surface of the cavity 102. Therefore, the fixed table 141 can be fixed within the cavity 102.

The body 101 is mounted on a rotary supporting base 154 made of a roller, and is rotatable in a radial direction of the body 101. Further, by fitting a spacer 155 into between the spindle unit 146 and the saddle 143, it is possible to adjust the height of the face mill 147 on the fixed table 141. The thickness of the spacer 155 is approximately the same as the size of each cell. The saddle 143 moves in a radial direction of the body 101 when a handle 156 provided on the movable table 142 is turned. Movement of the movable table 142 is controlled by a servomotor 157 provided at the end of the fixed table 141 and a ball screw 158. As the machining proceeds, the shape inside the cavity 102 changes. Therefore, the shapes of the reaction force receiver 148 and the moving block 152 of the clamp unit 150 need to be changed to suitable ones.

Figure 10:
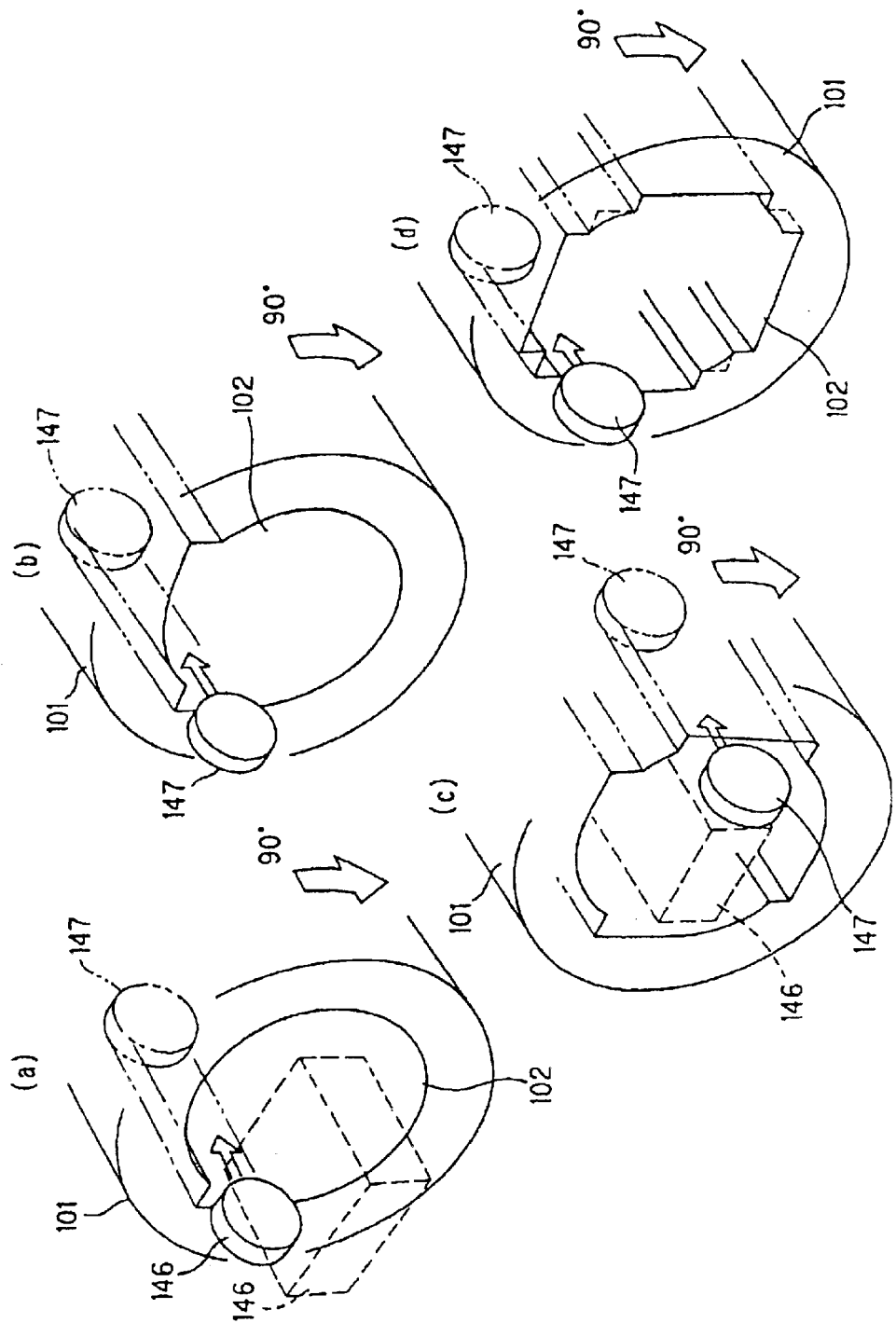
FIG. 10 is a schematic explanatory view which shows a method of machining a cavity.

FIG. 10 is a schematic explanatory view which shows the method of machining a cavity. First, the fixed table 141 is fixed at a predetermined position within the cavity 102 by the clamp units 150 and the reaction force receiver 148. Next, as shown in FIG. 10(*a*), the spindle unit 146 is moved along the fixed table 141 at a predetermined cutting speed, and the inside of the cavity 102 is cut by the face mill 147. After the cutting is completed at this position, the clamp units 150 are removed, and the fixed table 141 is released. Next, as shown in FIG. 10(*b*), the body 101 is turned by 90 degrees on the rotary supporting base 154, and the fixed table 141 is fixed by the clamp units 150. Then, the cutting is carried out by the face mill 147 in the same manner as explained above. Thereafter, the machining steps are further repeated two times.

The spindle unit 146 is turned by 180 degrees, and the inside of the cavity 102 is cut sequentially, as shown in FIG. 10(*c*). In this case, the machining is repeated while turning the body 101 by 90 degrees in the same manner as the above. Next, the spacer 155 is engaged with the spindle unit 146 to increase the height of the spindle unit, as shown in FIG. 10(*d*). Then, the face mill 147 is sent to an axial direction keeping the same height, and cutting is carried out along the inside of the cavity 102. This step is repeated while turning the cavity by 90 degrees, thereby to substantially complete a shape required for insertion of the basket 130. The cutting of the section into which the dummy pipe 308 is inserted may be carried out in the same manner as that shown in FIG. 10(*d*). However, a spacer thickness to adjust the height of the spindle unit 146 is set to be equal to one side of the dummy pipe 308.

Figure 11:
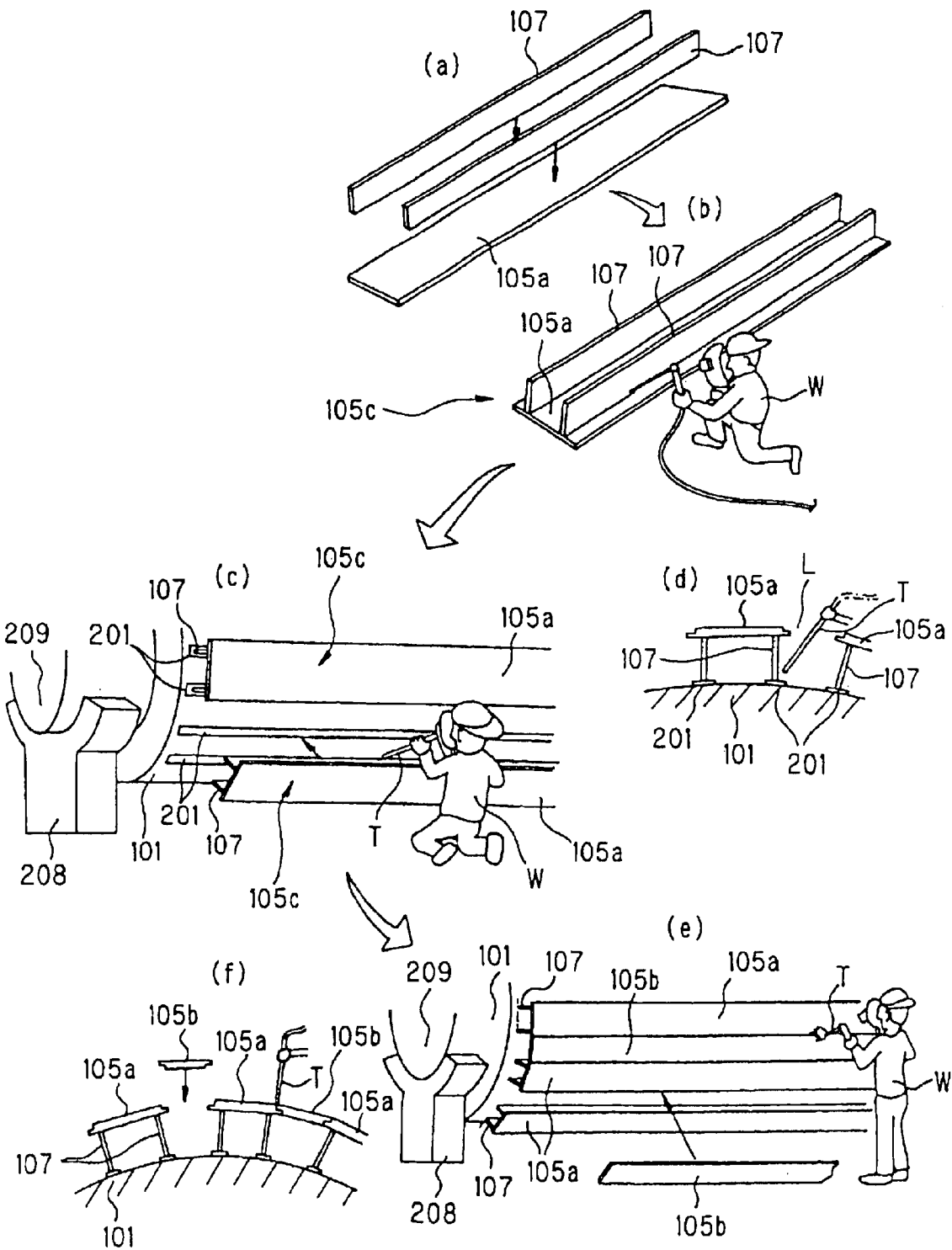
FIG. 11 is an explanatory view which shows an assembly procedure of an external cylinder and heat conductive fins.

FIG. 11 is an explanatory view which shows an assembly procedure of the external cylinder and heat conductive fins. First, as shown in FIG. 11(*a*), the belt-like member 105*a* is placed on the work plane, and the heat conductive fins 107 are erected on both sides of the belt-like member to support this belt-like member. At this time, the belt-like member 105*a* have a margin left along its both side edges outside from the fins 107. Based on a width of the space, the interval between the welded joints 204 and 205 (refer to FIG. 7) is determined. Next, as shown in FIG. 11(*b*), a worker W carries out the welding from the outside of the heat conductive fins 107, and form these elements as a unit 105*c* having a U shape in its cross section. The unit 105*c* is prepared in advance by a number that is required for disposing the unit 105*c* around the body 101 at a predetermined interval.

As shown in FIGS. 11(*c*) and 11(*d*), the unit 105*c* is welded to the body 101. The unit 105*c* is welded by fitting the heat conductive fins 107 to the bulge portions 201. At this time, the worker W manually carries out the welding from only the outside of the unit 105*c*, and does not carry out the welding from the inside of the unit 105*c*. Even if adjacent units 105*c* have been welded in advance, these units are welded at predetermined intervals, and therefore it is possible to carry out the welding by inserting a torch or an electrode bar (T) from the gap L. The body 101 is supported by a rotary supporting base 208 and a tool 209, and it is therefore possible to weld the unit 105*c* while turning the body 101.

As shown in FIGS. 11(*e*) and 11(*f*), another belt-like member 105*b* is covered over a gap between the adjacent belt-like members 105*a* and 105*a*, and the stage sections 203 of the member 105*b* are engaged with the adjacent stage sections 202 of the members 105*a*. The worker W welds the surface-side boundary between the belt-like member 105*a* and the belt-like member 105*b* (the welded joints 204). At this time, the welding is not carried out from the backside of the boundary. By welding all boundaries between the belt-like member 105*b* and the adjacent belt-like members 105*a*, the external cylinder 105 of the cask 100 is finished.

When the external cylinder 105 and the heat conductive fins 107 are assembled, it is not necessary to carry out the welding within a narrow and long space formed by the external cylinder 105 and the heat conductive fins 107. In other words, in the above reference example, the self-run type welding machine is run within the space formed between the external cylinder 503 and the heat conductive fins 508 to carry out the welding. However, when the external cylinder 105 and the heat conductive fins 107 of the above structures are assembled according to the above procedure, it becomes possible to carry out the whole of the welding step from the outside, and it is possible to assemble the cask using an ordinary welding facility without an exclusive welding machine. Therefore, the cask assembling work becomes extremely easy.

Referring to FIG. 1 and FIG. 2, the spent fuel assemblies that are accommodated in the cask 100 contain fissionable materials and fission products, and generate radiation with decay heat. Therefore, it is necessary to securely maintain the heat removing function, the shielding function, and the critical-state preventing function during the storage period (about 60 years). According to the cask 100 of the first embodiment, the inside of the cavity 102 of the body 101 is machined to insert the basket 130 so as to keep the external peripheral surface of the basket 130 in close contact with the cavity 102 (substantially no space) Further, the heat conductive fins 107 are provided between the body 101 and the external cylinder 105. Therefore, the heat from the fuel bar is conducted to the body 101 through the basket or the filled helium gas, and is discharged from the external cylinder 105 mainly through the heat conductive fins 107. From the above, it is possible to improve the thermal conductivity from the basket 130, and it becomes possible to efficiently remove the decay heat.

The gamma ray generated from the spent fuel assemblies is shielded by the body 101, the external cylinder 105, and the lid section 109, which are made of carbon steel or stainless steel. Further, neutron is shielded by the resin 106 to avoid the influence of exposure to radiation operators. Specifically, it is designed to obtain a shielding function such that a surface dose equivalent rate is 2 mSv/h or below, and a dose equivalent rate at 1 m deep from the surface is 100 $\mu$Sv/h or below. Further, as aluminum alloy containing boron is used for the sheet members 310 that constitute the cells to absorb neutron, it is possible to prevent the spent fuel assemblies from reaching a critical state.

As explained above, according to the cask 100 of the first embodiment, the external cylinder 105 has the split-type structure, and a plurality of units 105c are manufactured each consisting of the belt-like member 105a and the heat conductive fins 107. These units are welded to the body 101 from the outside at predetermined intervals. At the same time, the belt-like members 105b are covered over the whole gaps each between the adjacent belt-like members 105a, and are welded from the outside. Therefore, the welding in a narrow and long space is not necessary. Consequently, it is possible to carry out the welding work easily, and any special exclusive welding machine is not necessary. Further, as it is possible to assemble the cask 100 in widely used welding facilities, it is possible to carry out the assembling easily in the majority of companies.

Since the inside of the cavity 102 of the body 101 is machined to insert the basket 130 so as to keep the external peripheral surface of the basket 130 in close contact with the cavity, it is possible to improve the thermal conductivity from the basket 130. Particularly, the decay heat is efficiently transmitted to the body 101 via the heat conductive plates 318 that are provided on the external peripheral surface of the basket. Further, as a part of the angular cross section 301b of the basket 130 is in surface contact with the body 101, this contributes to secure holding of the basket 130 and improvement of the heat conduction efficiency. Further, by inserting the dummy pipe 308 in the space S, the heat conduction efficiency is more improved. It is needless to mention that in the above structure, it is possible to improve the thermal conductivity to some extent even if the heat conductive plates 318 are omitted.

Figure 39:
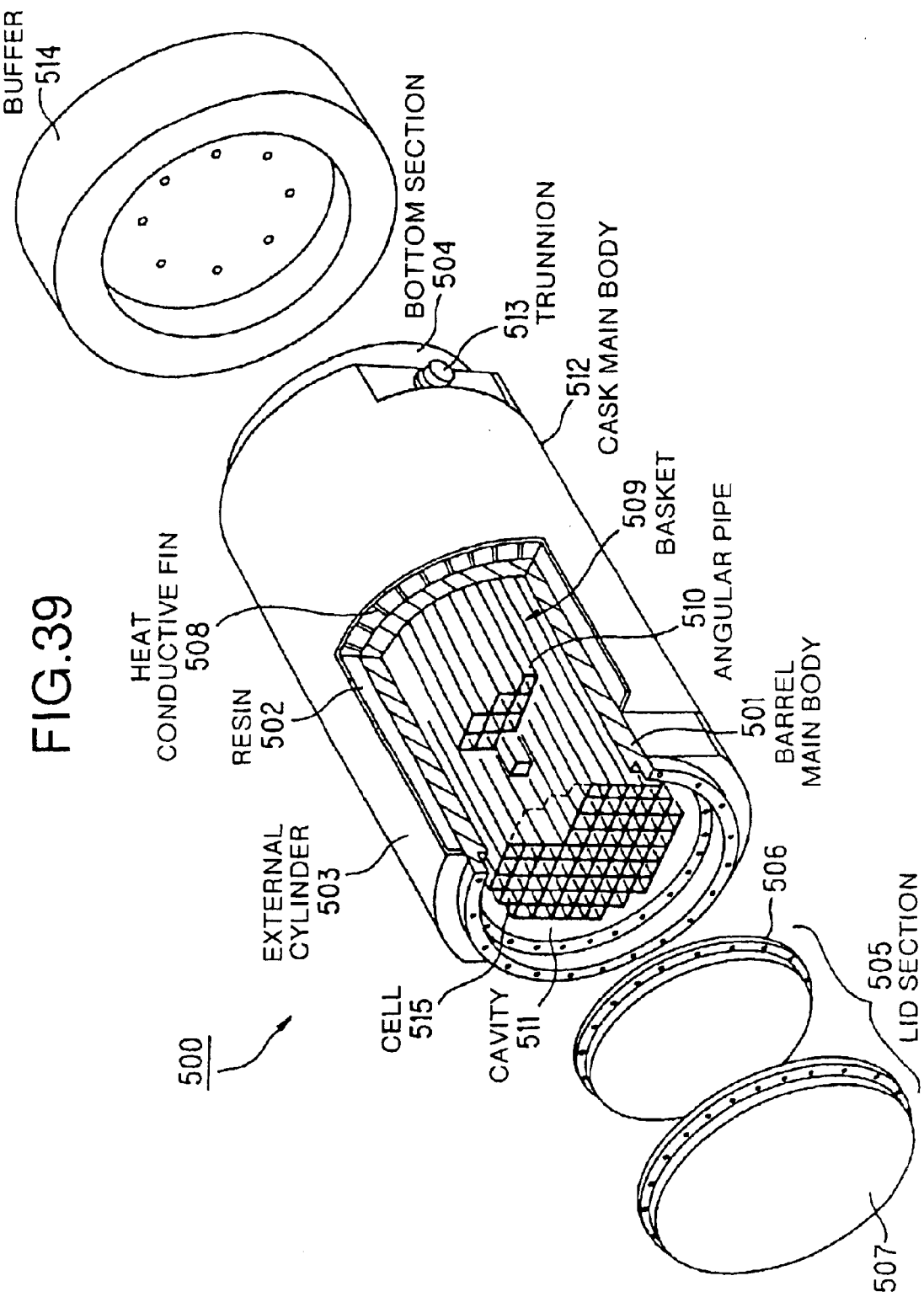
FIG. 39 is a perspective view which shows one example of a conventional cask.
Figure 40:
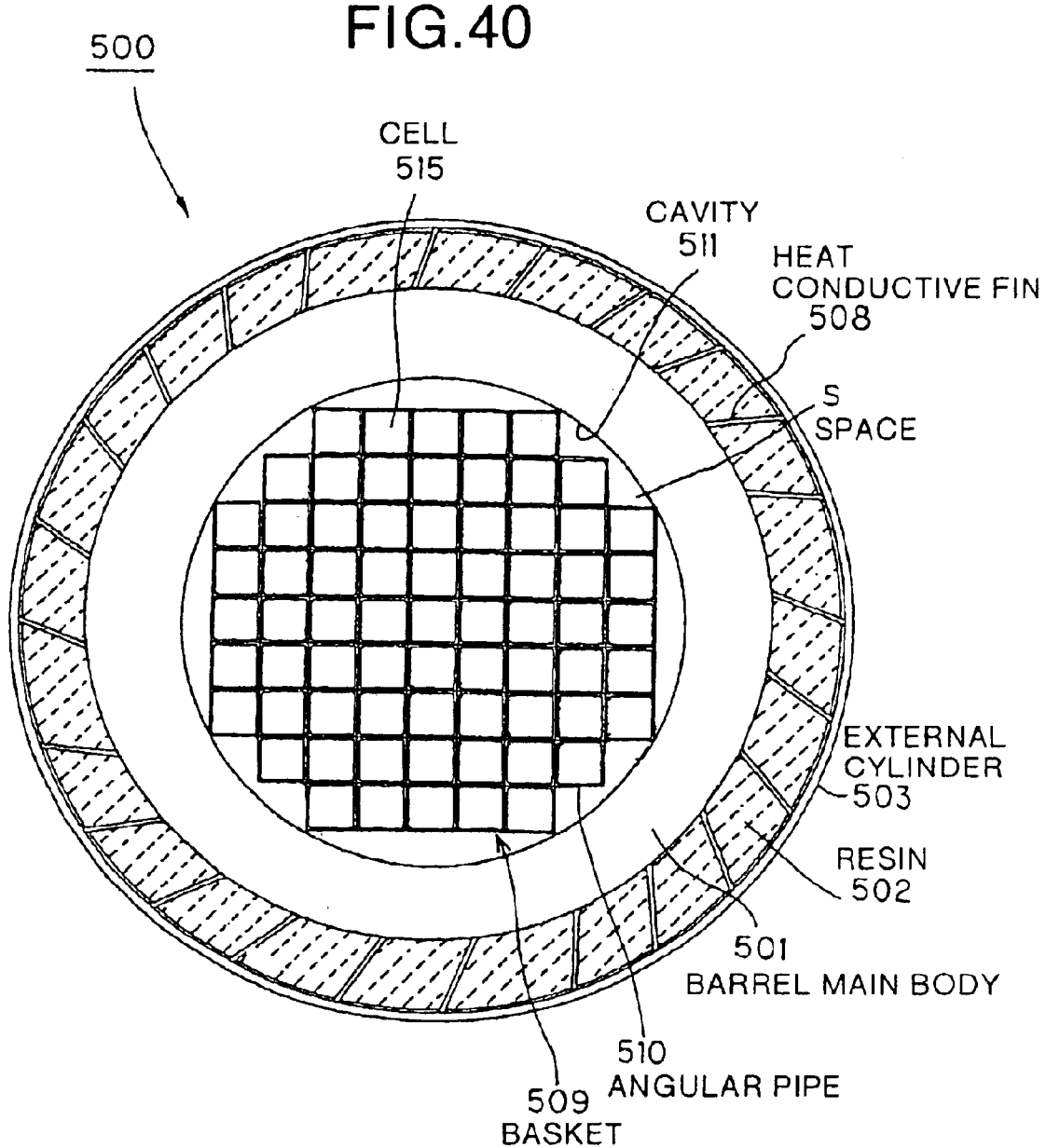
FIG. 40 is a cross-sectional view of the cask shown in FIG. 39 in its axial direction.
Figure 41:
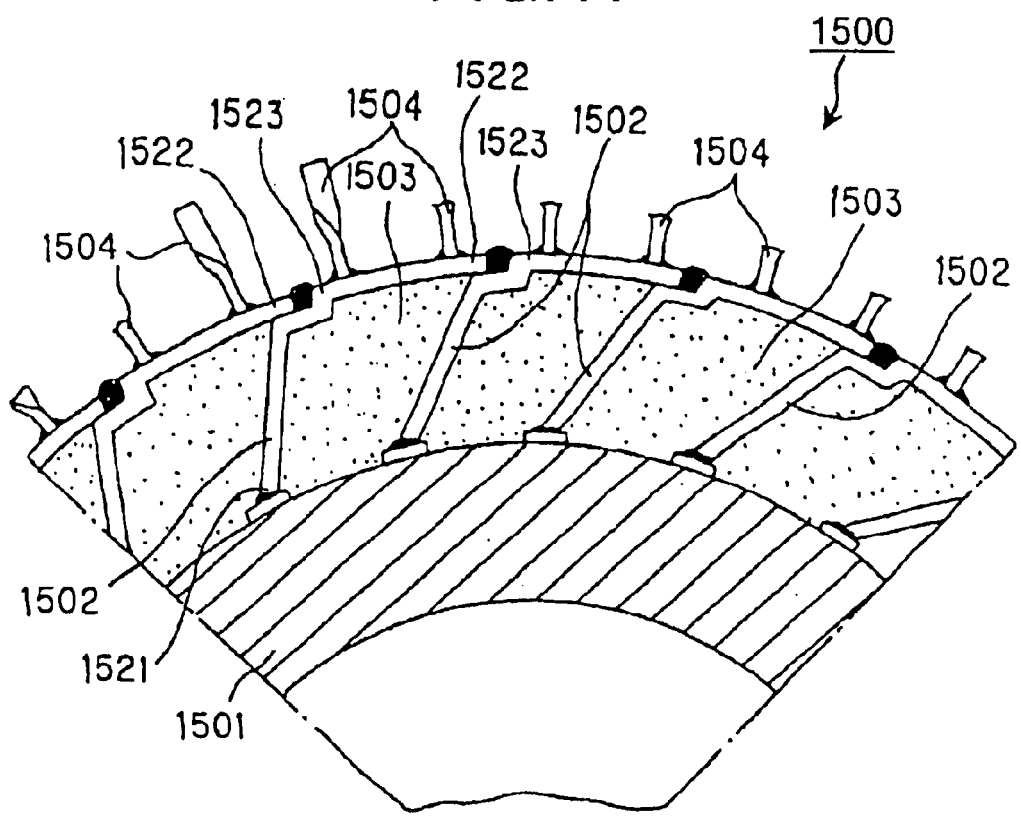
FIG. 41 is the structural diagram which shows one example of the conventional cask.
Figure 42:
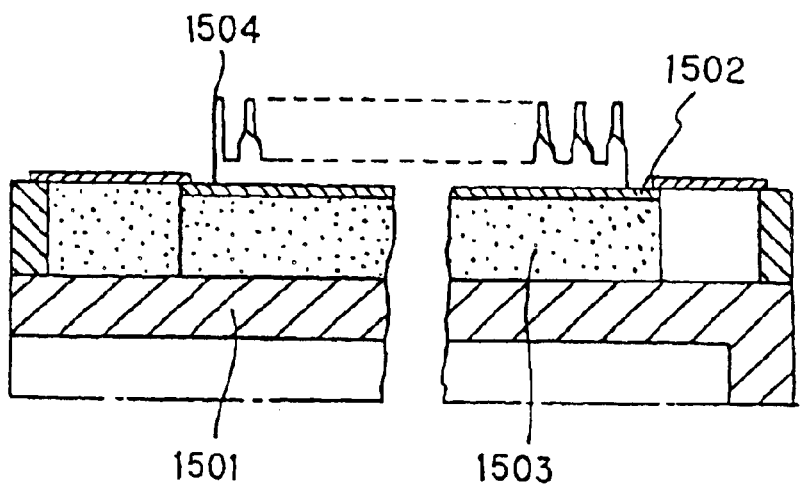
FIG. 42 is a cross-sectional view of the cask shown in FIG. 41 in its axial direction.

Since it is possible to eliminate the space within the cavity 102, the body 101 can be made compact and lightweight. Even in this case, the number of spent fuel assemblies to be accommodated is not decreased. On the contrary, when the external diameter of the body 101 is made equal to that of the cask 500 shown in FIG. 39, it is possible to ensure even larger number of cells by the amount. Therefore, it is possible to increase the number of spent fuel assemblies to be accommodated. Specifically, the cask 100 can accommodate 37 spent fuel assemblies, but the external diameter of the body of the cask can be restricted to 2560 mm and the weight thereof to 120 tons.

Figure 12:
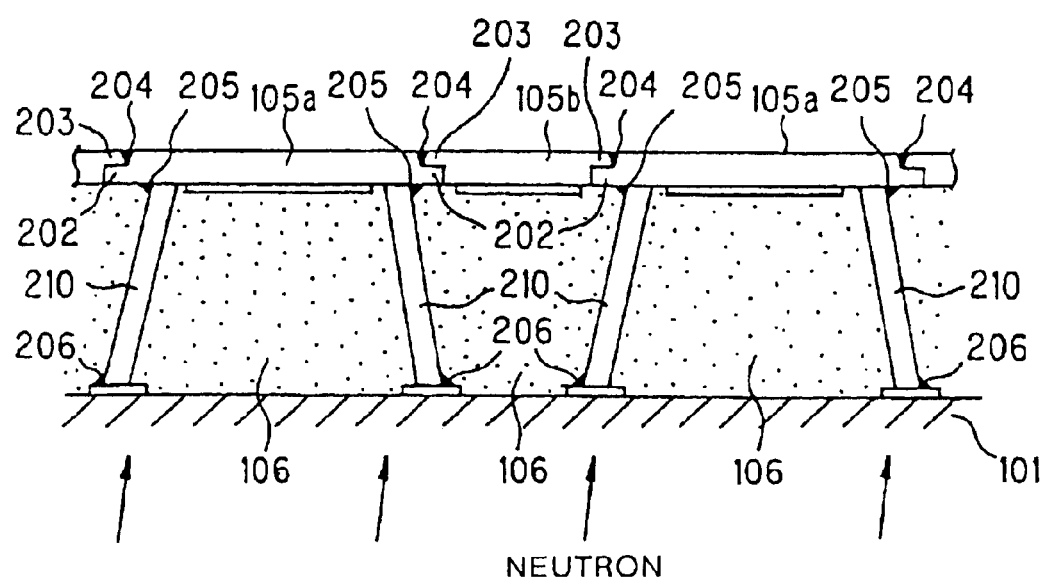
FIG. 12 is an explanatory view which shows a modification of the external cylinder and heat conductive fins.

Modification of the external cylinder and the heat conductive fins:

FIG. 12 is an explanatory view which shows a modification of the external cylinder and the heat conductive fins. As shown, heat conductive fins 210 may be inclined. The structures of the other elements are the same as those of the above cask. By diagonally disposing the heat conductive fins 210, the existence of the resin 106 in a direction in which neutrons are discharged from the spent fuel assemblies (arrow marks in the figure) prevents the neutrons from leaking to the outside through the heat conductive fins 210. While the heat conductive fins 210 are inclined in alternate directions as shown in the figure, it is also possible to dispose all heat conductive fins in a radial direction from the center of the container. Alternatively, the heat conductive fins 210 may be slanted in one direction (not shown).

Figure 13:
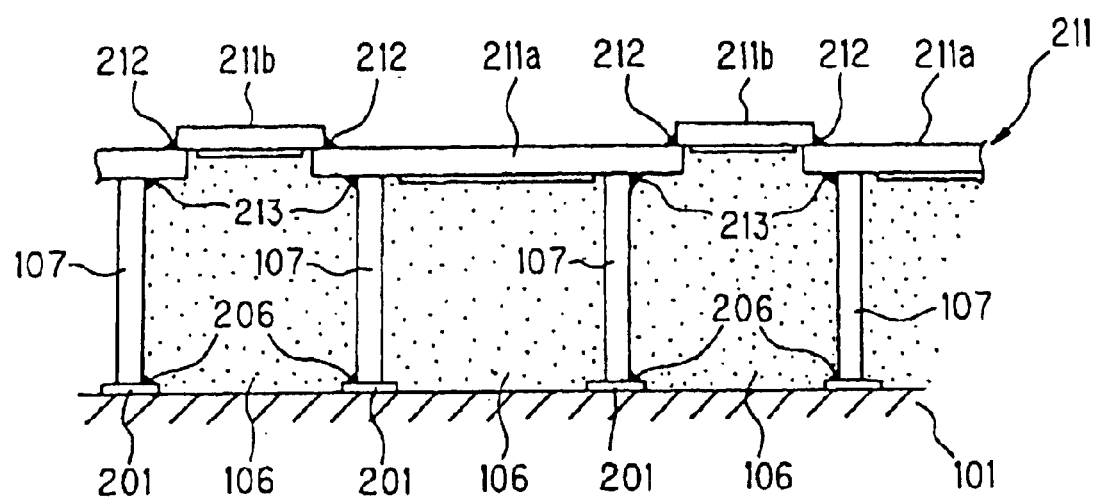
FIG. 13 is an explanatory view which shows a modification of the external cylinder and heat conductive fins.

As shown in FIG. 13, a belt-like member 211b may be welded in super imposition at edges of belt-like members 211a. In this case, the belt-like member 211a and heat conductive fins 107 are formed in a unit having a U-shaped cross section, and these units are welded to a body 101 respectively, and the belt-like members 211b are covered over the whole gaps each between the adjacent belt-like members 211a, and are welded. In this structure, it is also possible to assemble the cask easily in a similar manner and to prevent local concentration of thermally influenced sections, by separating welded joints 212 from welded joints 213. Further, as it is possible to omit stage preparation and beveling at the edges of the belt-like members, it is possible to simplify the structure of the external cylinder 211.

Figure 14:
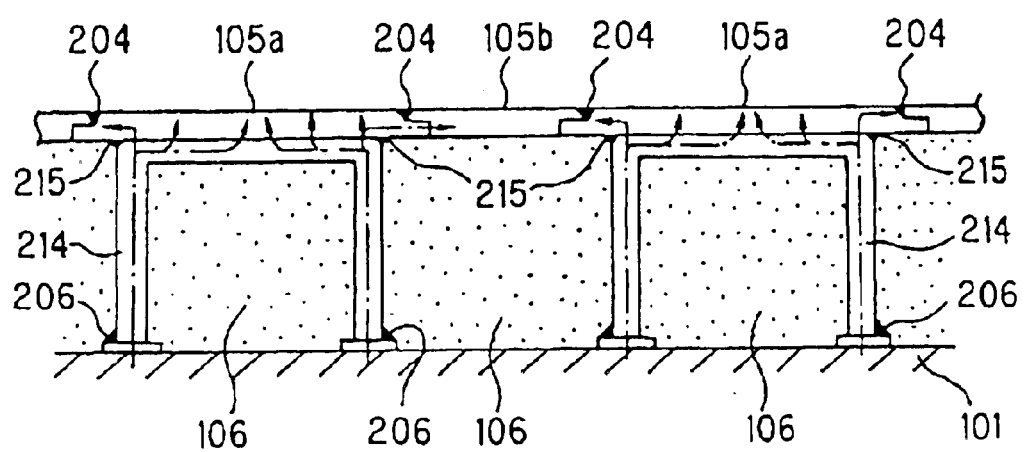
FIG. 14 is an explanatory view which shows a modification of the external cylinder and heat conductive fins.

In the structure shown in FIG. 14, a heat conductive fin 214 is bent in a U shape in its cross sections, and the belt-like member 105a is mounted on the upper surface of the heat conductive fin 214. Angular edge sections of the heat conductive fin 214 are welded with the belt-like member 105a (welded joints 215). With this arrangement, since the welding is carried out by mounting the heat conductive fins 214 on the belt-like members 105a, it becomes easy to carry out the assembling. Further, like in the above cases, it is possible to carry out the entire welding step from the outside, without welding in a narrow and long space. Therefore, it is possible to assemble the cask easily. Further, by separating the welded joints 204 from the welded joints 215, it is possible to prevent local concentration of thermally influenced sections. Further, as the heat conductive fins 214 made of copper are in surface contact with the belt-like members 105a, it is possible to efficiently transmit the decay heat from the inside of the cask to the external cylinder 105 and radiate the heat to the outside. In FIG. 14, a dashed line shows a heat radiation route.

Figure 15:
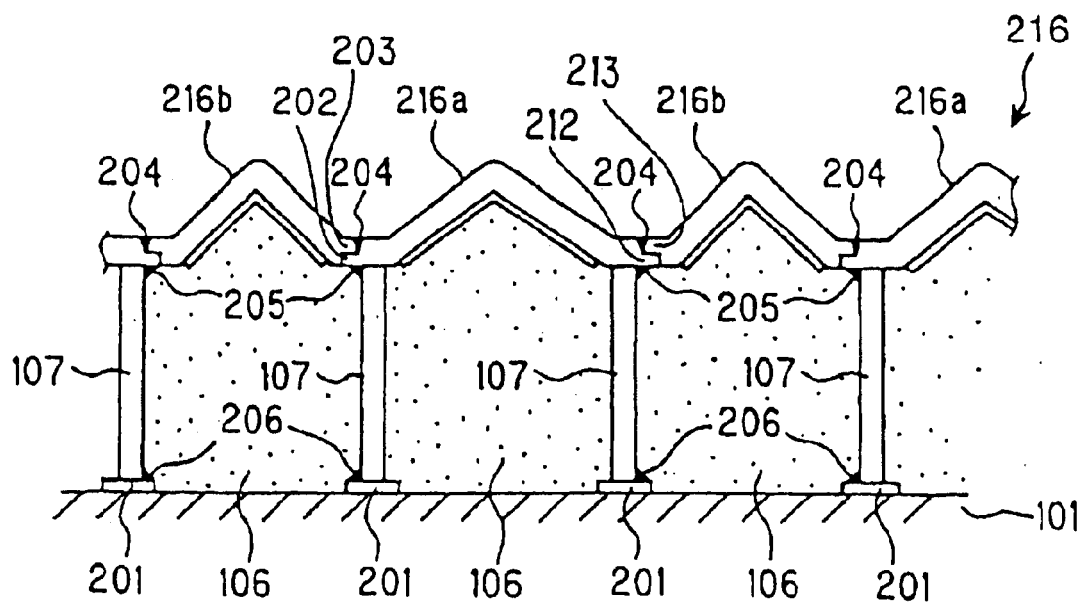
FIG. 15 is an explanatory view of a cask according to a second embodiment of this invention.

Second Embodiment:

FIG. 15 is an explanatory view of a cask according to the second embodiment of this invention. This cask is characterized in that an external cylinder 216 has an angular shape in its cross section. Heat conductive fins 107 are welded to both edges of a belt-like member 216a that is formed in an angular shape by bending (welded joints 205), thereby to form a unit. These units are welded onto bulge portions 201 of the body 101 (welded joints 206). Further, belt-like member 216b is formed by bending in the similar manner. The stage section 203 of the belt-like member 216b is engaged with the stage section 202 of the belt-like member 216a and is welded from the outside (welded joints 204). Honeycomb members are provided on the internal surfaces of the belt-like members 216a and b. A resin that absorbs neutron is filled in spaces formed with the belt-like members 216a or 216b and the heat conductive fins 107.

In the above structure, it is possible to carry out the entire welding step from the outside, and therefore it is also possible to assemble the cask in the similar manner to the above. Further, by separating the welded joints 204 from the welded joints 205, it is possible to prevent local concentration of thermally influenced sections. Further, as the belt-like members 216a and b are in an angular shape, the surface area of the external cylinder 216 becomes large, which makes it possible to improve the heat radiation effect. Further, when the cask has a plurality of sheet-like heat radiation fins stretched to the external cylinder, it is difficult to clean the corners between the heat radiation fins and the external cylinder. However, in the case of the angular external cylinder 216, there is no narrow corner. Therefore, this has an advantage that it is easy to clean the surface of the external cylinder. When the external cylinder has a valley shape instead of the angular shape, there is the same effect as explained above (not shown).

Figure 16:
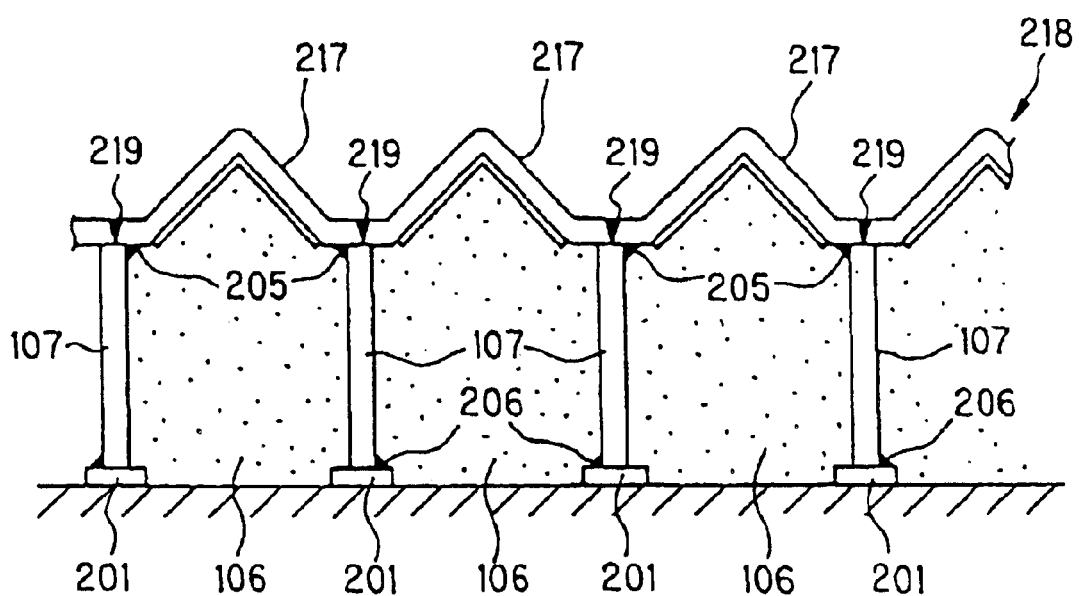
FIG. 16 is a modification of the cask shown in FIG. 15.

As shown in FIG. 16, the edge of belt-like member 217 and the edge of the adjacent belt-like member 217 are butted on the top of the edge of the heat conductive fin 107, and the butt sections are welded (welded joints 219). The ends of the belt-like members 217 are beveled in advance. By preparing the external cylinder 218 in an angular shape, it is possible to improve the heat radiation performance of the cask.

Figure 17:
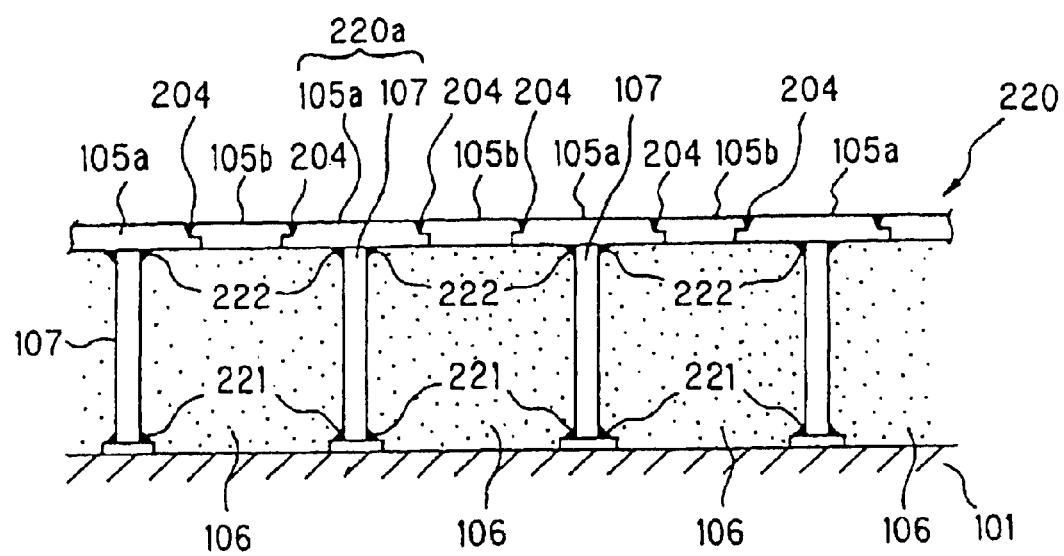
FIG. 17 is an explanatory view which shows a cask according to a third embodiment of this invention.

Third Embodiment:

FIG. 17 is an explanatory view which shows a cask according to the third embodiment of this invention. An external cylinder 220 of this cask is characterized in that a unit 220a having a T shape in its cross section is prepared by welding (welded joints 222) the heat conductive fin 107 at the center of a belt-like member 105a. The welding procedure is approximately similar to that of the first embodiment. First, the heat conductive fin 107 is welded to the belt-like member 105a to provide the unit 220a. The welding of the heat conductive fin 107 and the belt-like member 105a may be carried out from one side, or may be carried out from both sides in order to secure strength (welded joints 222). Next, these units 220a are welded to the body 101 at predetermined intervals. The body 101 is provided with a bulge portion 201, and the heat conductive fin 107 is welded on the bulge portion 201. Further, the welding is carried out from both sides of the heat conductive fin 107 in order to secure strength. Then, belt-like members 105b are fitted into all the gaps each between the adjacent belt-like members 105a, and are welded (welded joints 204).

Figure 18:
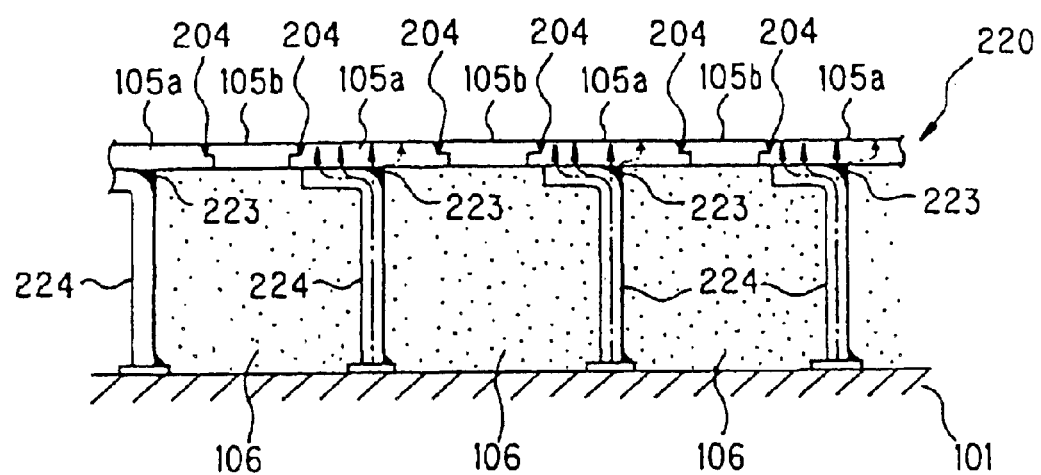
FIG. 18 is an explanatory view which shows a modification of the cask shown in FIG. 17.

In this structure, it is possible to carry out the entire welding work from the outside, without welding in a narrow and long space. Therefore, it is possible to assemble the cask easily in the same manner as the above. Further, by forming the cross section in the T shape, it is possible to provide a more distance between the welded joints 222 and 204 than the distance provided in the first and second embodiments. Therefore, it is possible to prevent local concentration of thermally influenced sections. Further, as shown in FIG. 18, the edges of heat conductive fins 224 may be bent in an L shape in their cross sections, and may be in surface contact with the belt-like members 105a. In this case, in welding of the heat conductive fins 224 to the belt-like members 105a, the belt-like member 105a is welded to a corner edge of the heat conductive fin 224 (welded joints 223).

With the above arrangement, since the welding can be carried out by mounting the heat conductive fins 224 on the belt-like members 105a, it becomes easy to carry out the assembling. Further, as the heat conductive fins 224 made of copper are in surface contact with the belt-like members 105a, it is possible to efficiently transmit the decay heat from the inside of the cask to the external cylinder 220 and radiate the heat to the outside. In the figure, a dashed line shows a heat radiation route.

Figure 19:
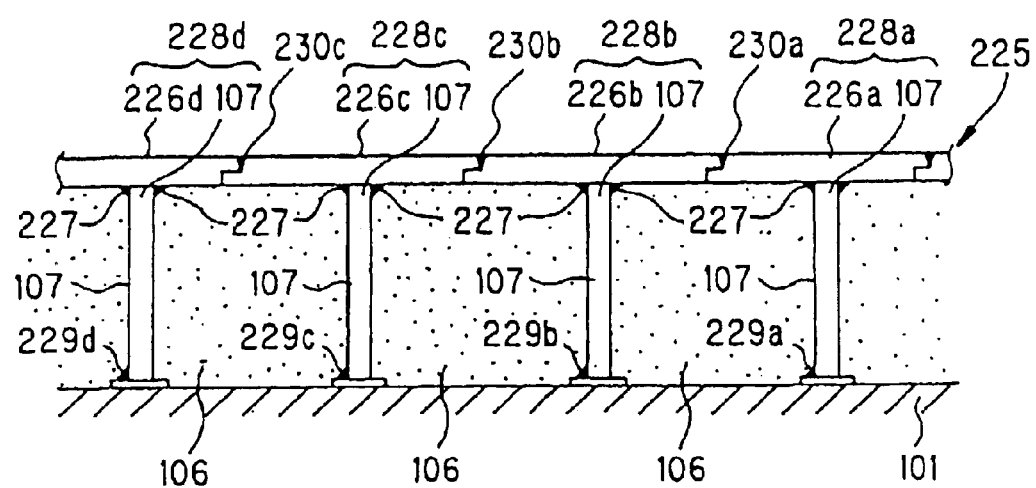
FIG. 19 is an explanatory view which shows a modification of the cask shown in FIG. 17.

FIG. 19 is an explanatory view which shows a modification of the cask shown in FIG. 17. According to this cask, an external cylinder 225 is constructed of belt-like members 226, each being welded to a heat conductive fin 107 at the center of the member 226 (welded joints 227) and formed in a unit 228 having a T shape in its cross section. For assembling this external cylinder 225, the heat conductive fin 107 of a unit 228a is first welded to the body 101 from one side (welded joints 229a). Next, the heat conductive fin 107 of a unit 228b is welded to the body 101 from one side that is open (welded joints 229b), and the belt-like members 226a and 226b are welded together (welded joints 230a).

Likewise, the heat conductive fin 107 of a unit 228c is welded to the body 101 from one side that is open (welded joints 229c), and the belt-like members 226b and 226c are welded together (welded joints 230b). The heat conductive fin 107 of a unit 228d is also welded to the body 101 at welded joints 229d, and the belt-like members 226c and 226d are welded together at welded joints 230c. With the above arrangement, it is also possible to carry out the entire welding work from the outside, and the welding in a narrow and long space is not necessary. Therefore, the cask assembling work becomes extremely easy. Further, as the welded joints 230 are sufficiently separated from the welded joints 227, it is possible to prevent local concentration of thermally influenced sections.

Figure 20:
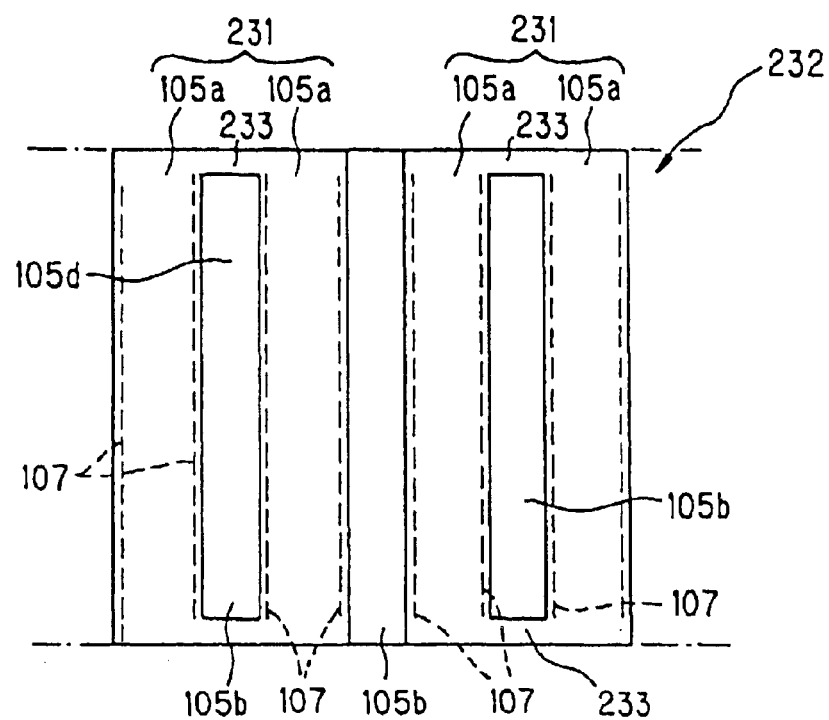
FIG. 20 is a top plan view which shows an external cylinder of a cask according to a fourth embodiment of this invention.

Fourth Embodiment:

FIG. 20 is a top plan view which shows an external cylinder of a cask according to the fourth embodiment of this invention. While the external cylinder 232 is formed by welding the belt-like members for connection in the above embodiment, belt-like members 105a that constitute an external cylinder 105 may be connected at ends of the cask in its axial direction. Four heat conductive fins 107 (shown by a dotted line in the figure) are welded to one sheet member 231 at predetermined intervals. Further, the belt-like members 105a are welded to the body together with the heat conductive fins 107 at predetermined intervals. A belt-like member 105d is fitted in a hollow section 105d and in a gap between the adjacent sheet members 231, and is welded respectively. As the heat conductive fin 107 is not disposed at a position opposite to a coupling section 233, this does not interfere with the welding work.

Figure 21:
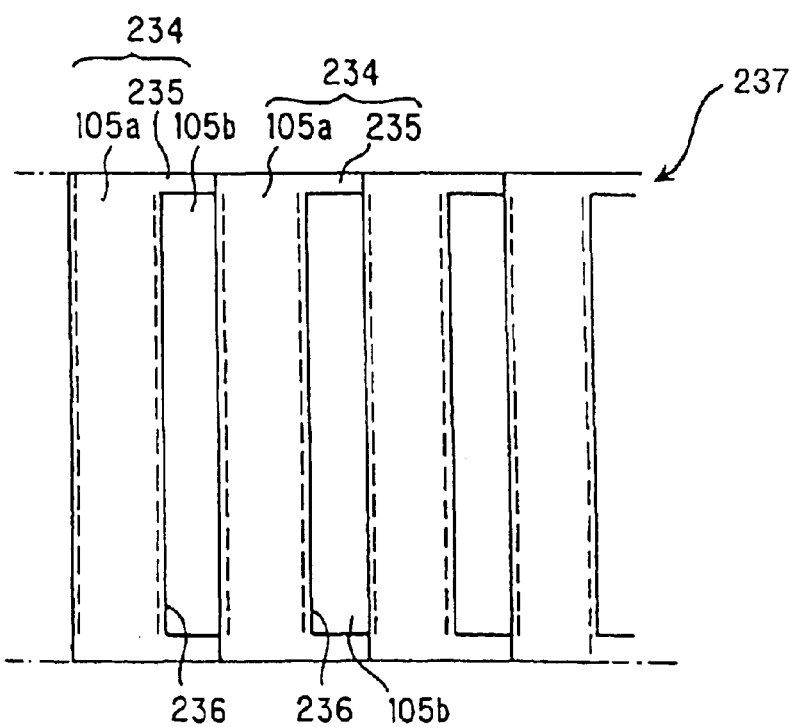
FIG. 21 is a top plan view which shows a modification of the external cylinder shown in FIG. 20.

As shown in FIG. 21, by forming a sheet member 234 in a U shape, the adjacent sheet members 234 may be coupled to each other via a coupling section 235. In this structure, the belt-like member 105b is fitted in a hollow section 236 formed on the sheet member 234, and is welded. With this arrangement, an external cylinder 237 is formed.

Figure 22:
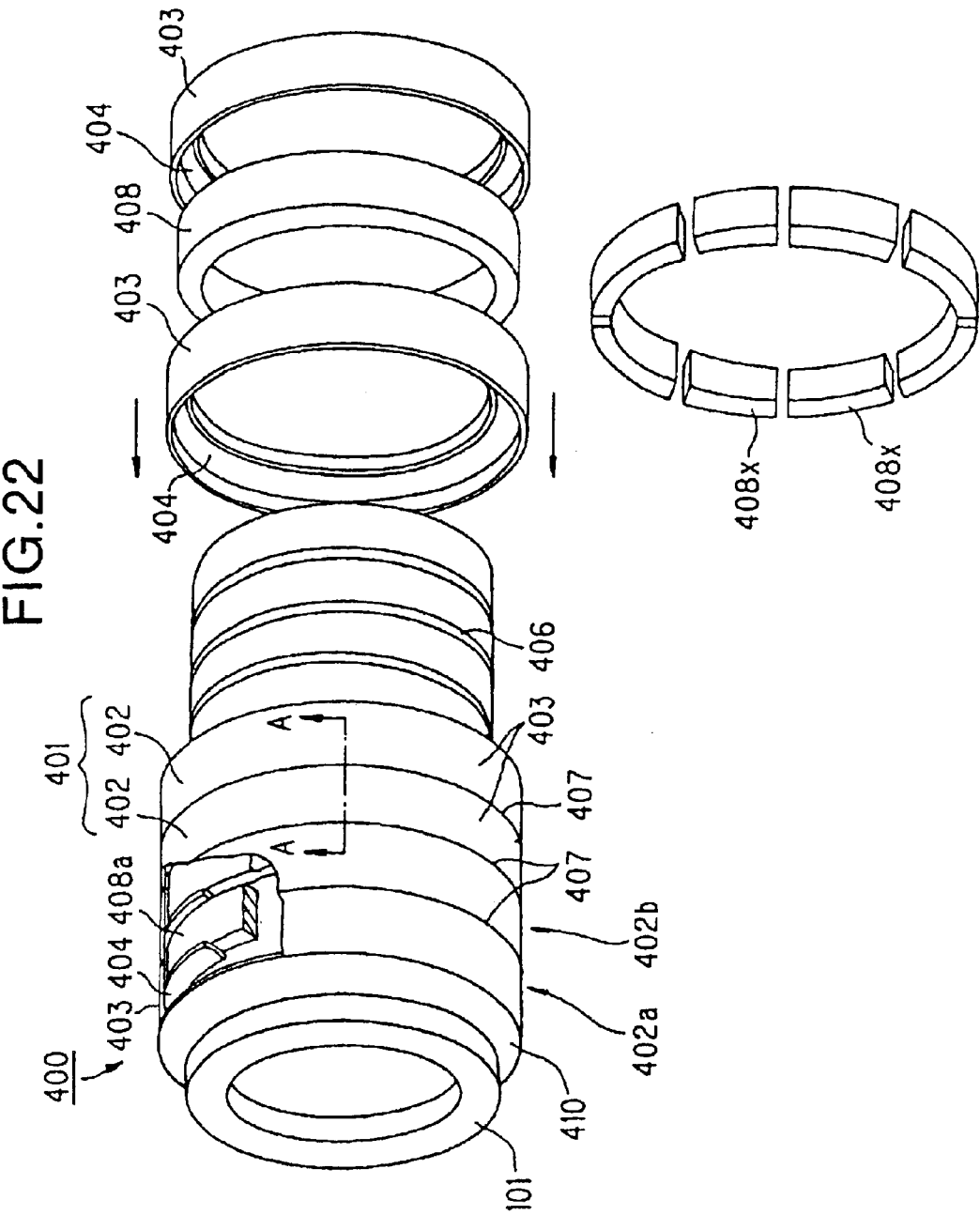
FIG. 22 is an assembly view which shows a cask according to a fifth embodiment of this invention.
Figure 23:
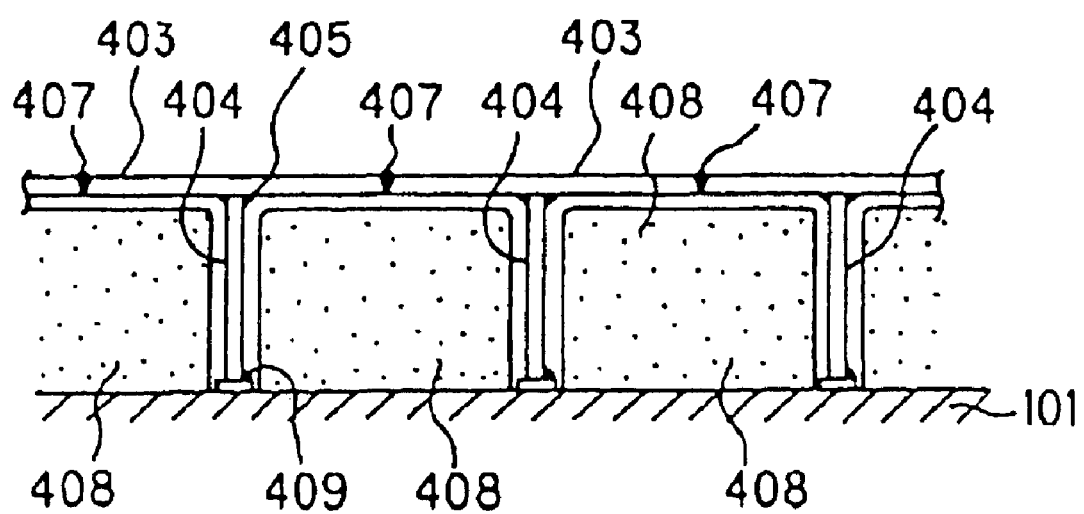
FIG. 23 is an A—A cross-sectional view shown in FIG. 22.

Fifth Embodiment:

FIG. 22 is an assembly view which shows a cask according to the fifth embodiment of this invention. FIG. 23 is a cross-sectional view of the cask taken along the line A—A shown in FIG. 22. This cask 400 is provided by forming units 402 of an external cylinder 401 in a ring shape, and by sequentially inserting these units into the body 101 in its radial direction and by welding the units. The ring-shaped unit 402 has a structure that a belt-like plate is formed into a ring-shaped plate 403, and a ring-shaped heat conductive fin 404 is welded to the internal peripheral surface of the plate 403. (welded joints 405). This unit 402 is fixed by welding its heat conductive fin 404 to a bulge portion 406 provided on a circumferential direction of the body 101. These units 402 are fitted to the body 101, and peripheral edges of the ring sheets 403 of adjacent units 402 are welded together (welded joints 407). A ring-shaped resin 408 cured in advance with a mold is disposed in a space formed with these peripheral edges of the ring sheets 403 that are welded together.

In assembly of the cask 400, a first unit 402a is inserted into the body 101, and the heat conductive fin 404 of the unit is welded to the bulge portion 406 of the body 101. Next, a ring-shaped resin 408a is inserted into the body 101, and about a half of the resin is accommodated into the unit 402a that has been already welded and fixed. Then, the next unit 402b is inserted into the body 101, and about a half of the resin 408a is accommodated into the inside of the body. The ring sheet 403 of the first unit 402a and the ring sheet 403 of the next unit 402b are welded together (welded joints 407). At this time, the welding of the heat conductive fin 404 of the unit 402b is carried out from only an open side (welded joints 409). This operation is repeated by a predetermined number of times. The assembling of the external cylinder 401 is finished when the last unit 402 has been fitted. When it is difficult to insert the ring-shaped resin 408, the resin 408 may be divided into some pieces in a circumferential direction, and arc-shaped resins 408x may be accommodated into the space. Lids 410 are provided at both sides of the external cylinder 401.

Based on the above structure, it is possible to carry out all the welding work from the outside, without welding in a narrow and long space. Therefore, it is possible to carry out the welding easily, and a specific exclusive welding machine is not necessary. Further, as it is possible to assemble the cask 400 in widely used welding facilities, it is possible to carry out the assembling easily in the majority of companies. Further, as the welded joints 405 are separated from the welded joints 407, it is possible to prevent local concentration of thermally influenced sections.

Figure 24:
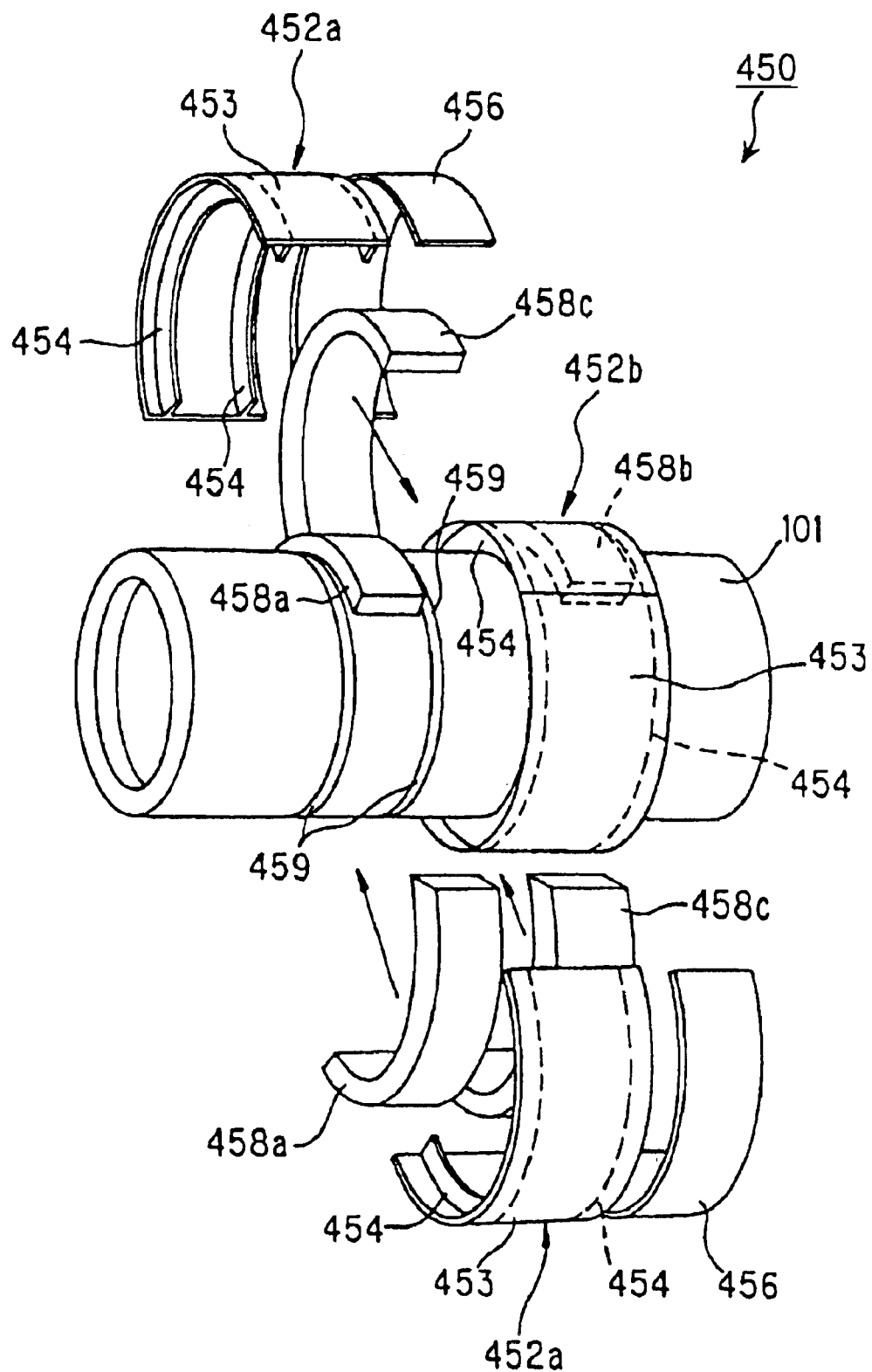
FIG. 24 is an assembly view which shows a modification according to the fifth embodiment of this invention.
Figure 25:
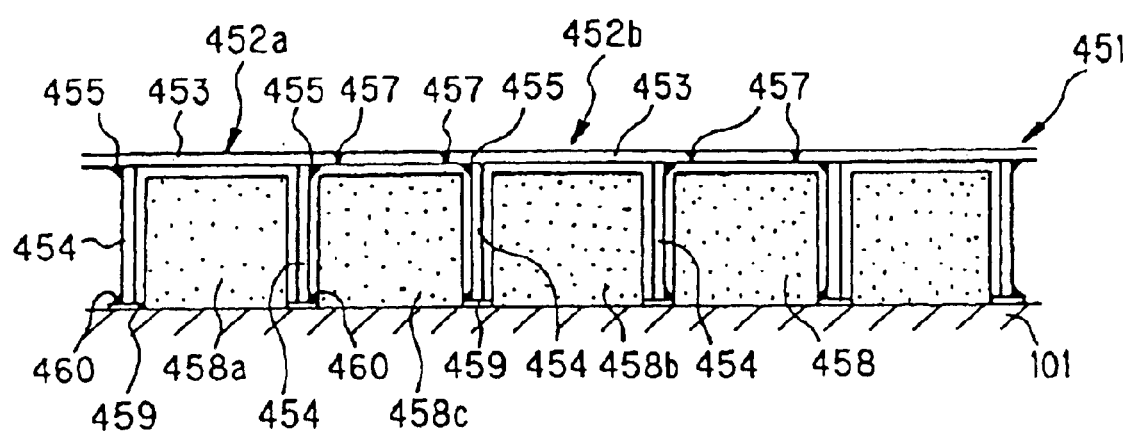
FIG. 25 is a cross-sectional view of a part of the cask shown in FIG. 24.

FIG. 24 is an assembly view which shows a modification according to the fifth embodiment of this invention. FIG. 25 is a cross-sectional view of a part of the cask shown in FIG. 24. This cask 450 is characterized in that a unit 452 of an external cylinder 451 is divided into two arc-shaped sections. Heat conductive fins 454 are welded to edges of the internal surfaces of an arc plate 453, by leaving a slight margin respectively (welded joints 455), thereby to form one unit 452. These units 452 are welded to the body 101 at predetermined intervals. Further, an arc plate 456 is fitted in a gap between the arc plate 453 and the arc plate 453 of the unit 452, and is welded (welded joints 457). Further, the units 452 are welded together and the arc plates 456 are welded together in the circumferential direction of the body 101, to form a ring-shaped integrated structure. A resin 458 formed in an arc shape is placed in the space formed with the units 452, and in the space formed with the unit 452 and the arc plate 456, respectively.

In assembling of this cask 450, the resin 458 is first mounted on the body 101, and the unit 452a is covered to accommodate this resin 458 in the inside. Then, the heat conductive fins 454 of the unit 452a are mounted on bulge portions 459 provided around the body 101, and the welding is carried out from both sides of the fins, which are open (welded joints 460). Then, the remaining latter half of the resin 458 is mounted on the body 101, and the unit 452 is covered to accommodate the resin 458 in the inside, in the same manner as explained above. At the same time, the ends of the arc plates of the units are welded together. Further, the unit 452b with the resin 458b is welded in an axial direction of the body 101 at a predetermined interval, and this process is repeated by a necessary number of times. When the unit 452b is fixed to the body 101, the resin 458c is disposed in advance between the units 452a and 452b. This resin 458c is engaged with the edges of the arc plate edges of the units 452a and 452b on both sides so as not to be removed from this place.

The arc plates 456 are fitted in the whole gaps each between the units 452, and the arc plates 453 and the arc plates 456 are welded from the outside. Then, the assembling of the external cylinder 451 is finished. Further, instead of using a molded resin, it is also possible to fill a resin from a hole provided on the arc plate 453 (not shown). Based on the above structure, it is possible to carry out all the welding work from the outside, without welding in a narrow and long space. Therefore, it is possible to carry out the welding easily, and a specific exclusive welding machine is not necessary. Further, as the welded joints 455 are separated from the welded joints 457, it is possible to prevent local concentration of thermally influenced sections. Further, the welding may be carried out after such steps that the resin 458 (458c) is divided into resins in the circumferential direction, the units 452a and 452b are welded respectively, the divided resins 458c are sequentially inserted into a space between the units 452a and 452b, and the arc plate 456 is covered over the resin 458c (not shown).

Figure 26:
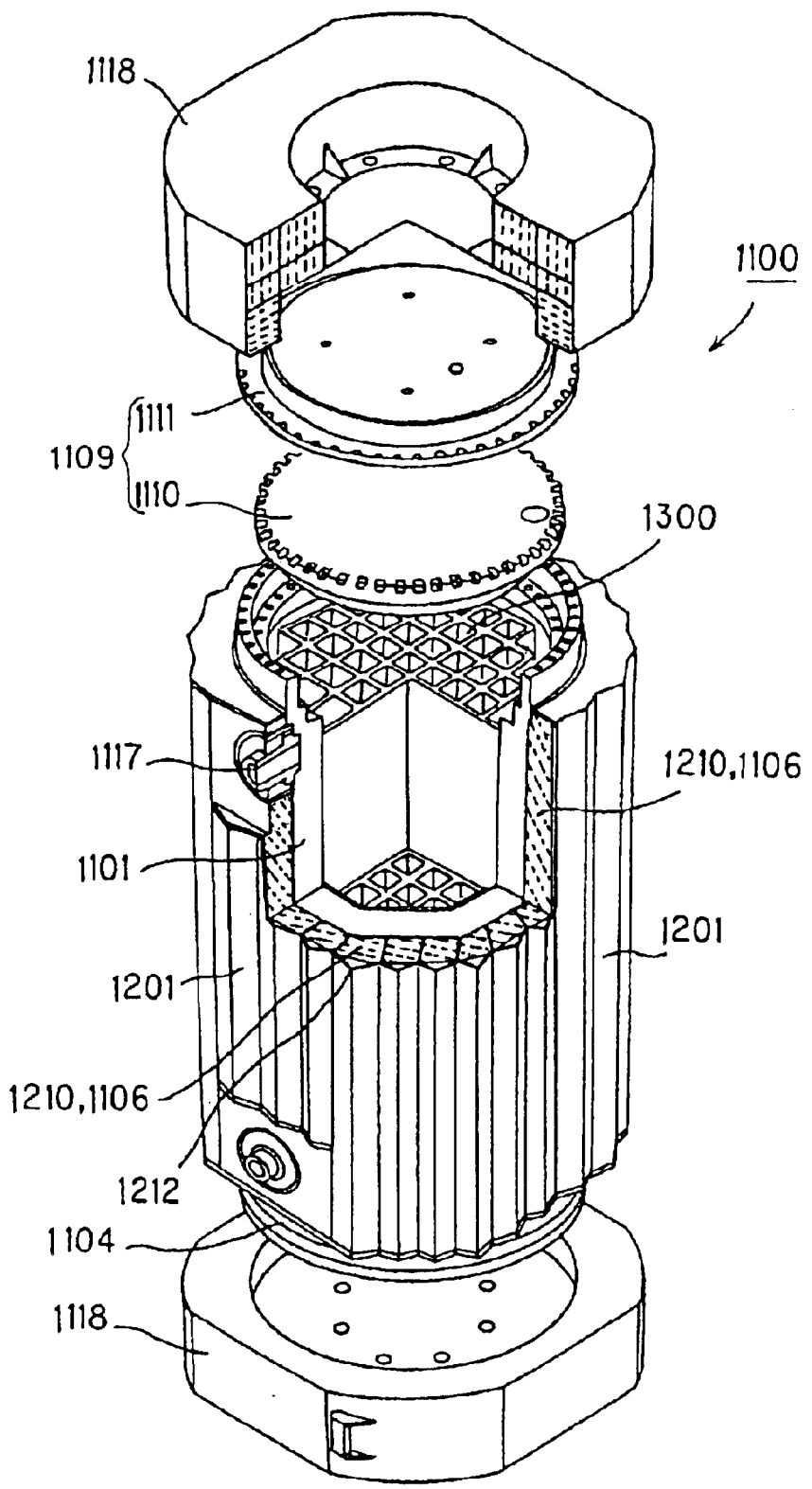
FIG. 26 is a perspective view which shows a cask according to a sixth embodiment of this invention.
Figure 27:
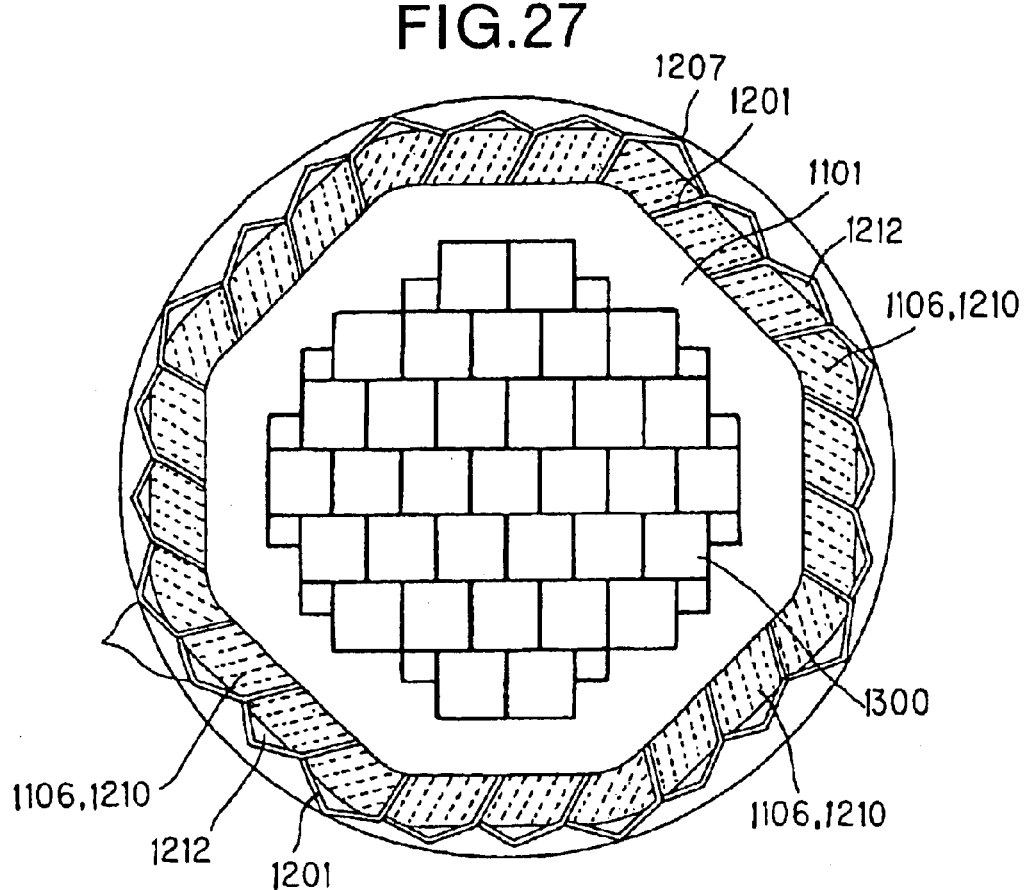
FIG. 27 is a cross-sectional view of the cask shown in FIG. 26 in its radial direction.

Sixth Embodiment:

FIG. 26 is a perspective view which shows a cask according to the sixth embodiment of this invention. FIG. 27 is a cross-sectional view of the cask in its radial direction shown in FIG. 26. In this cask 1100, a body 1101 and a bottom plate 1104 of the body 1101 are forged products that are made of carbon steel having a gamma-ray shielding function. It is possible to use stainless steel instead of carbon steel. The body 1101 and the bottom plate 1104 are connected together by welding. In order to secure sealing performance of the cask as a pressure-resistant vessel, a metallic gasket is provided between a primary lid 1110 and the body 1101 (not shown).

Figure 28:
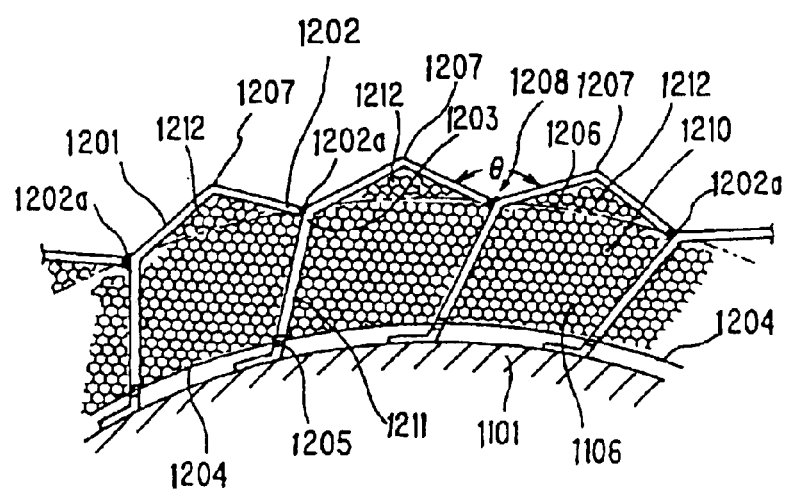
FIG. 28 is a partially enlarged view shown in FIG. 27.

As shown in FIG. 28, sheet members 1201 are fixed to the external periphery of the body 1101. This sheet member 1201 is formed by bending a rectangular iron plate, aluminum plate, or copper plate, and is characterized in that a section corresponding to the external cylinder of the cask 1100 is formed in an angular shape (an angular-shaped portion 1207). An edge 1202 of the sheet member 1201 is welded to a bent edge 1203 of an adjacent sheet member 1201 (welded joints 1202a). The sheet member 1201 functions as what is called a heat conductive fin that releases the decay heat of the spent fuel assemblies to the outside. On the other hand, the sheet member 1201 is fixed by passing a wire 1204 through edge fixing holes 1205, and winding this wire 1204 around the body 1101. The sheet member 1201 may be formed by extrusion.

A honeycomb member 1210 made of aluminum or copper having excellent thermal conductivity is provided in a space 1206 formed between the sheet member 1201 and the external surface of the body 1101. The cells of the honeycomb member 1210 are formed in an axial direction of the cask 1100, and the periphery of the cells is in contact with the internal surface 1211 of the space 1206. This is because the efficiency of conducting heat from the body 1101 is improved. A part of this honeycomb member 1210 is filled with a resin 1106 that is a polymer material containing much hydrogen and having a neutron shielding function. On the other hand, at the external peripheral side of the honeycomb member 1210, a void layer 1212 not filled with the resin 1106 is provided in order to absorb thermal expansion of the resin 1106 and the like. The honeycomb member 1210 is filled with the resin 1106 to be combined together in some other place, and they are inserted into the space 1206 and are fixed. Alternatively, the resin 1106 in a fluid status may be injected into the space 1206 in which the honeycomb member 1210 is inserted, and cured based on a thermosetting reaction or the like.

Figure 29:
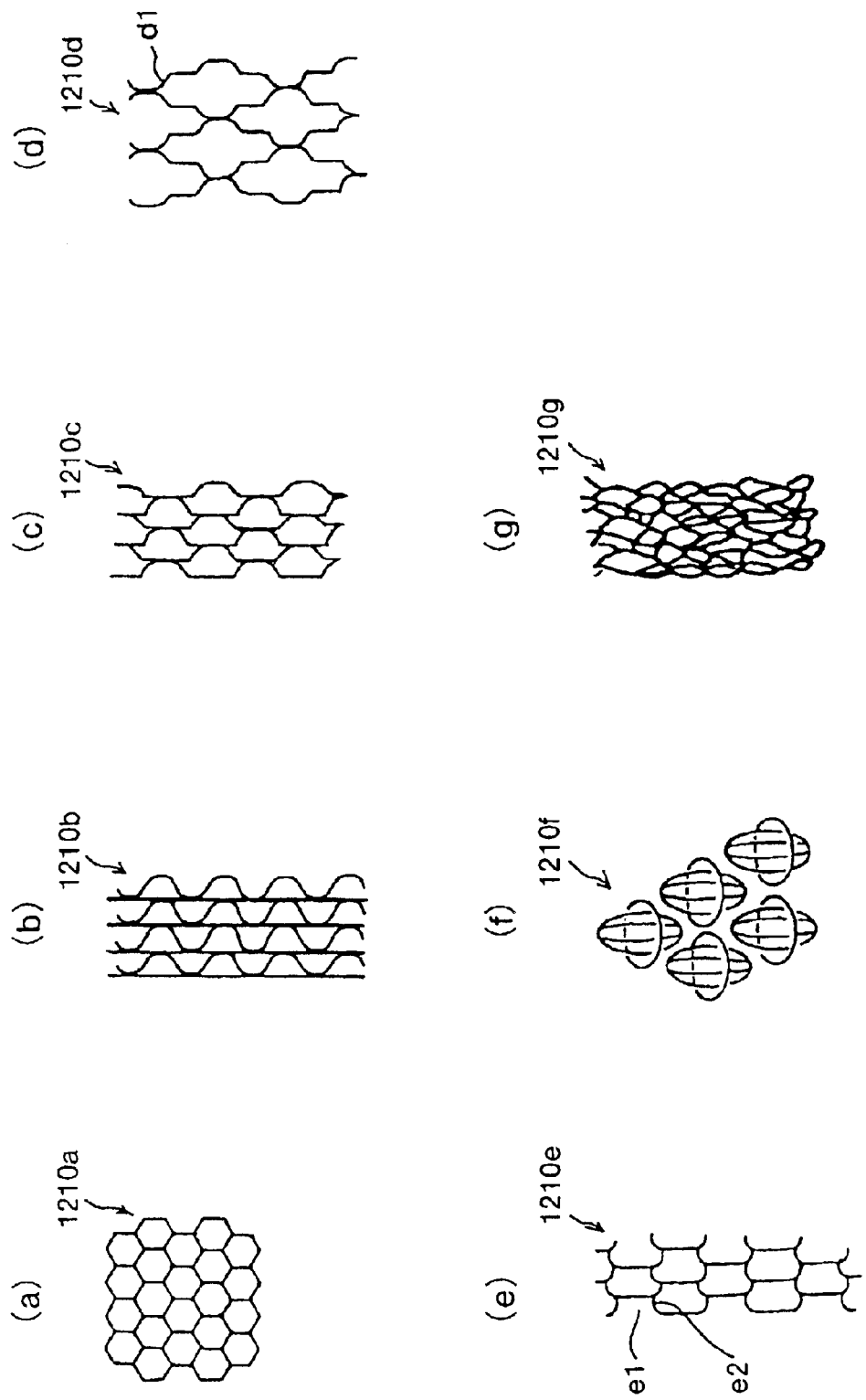
FIG. 29 is an explanatory view which shows a honeycomb member and a heat conductive material.

For the honeycomb member 1210, it is possible to selectively use, as required, any of various kinds of materials such as a roll core or a corrugated core in addition to an ordinary honeycomb member having a hexagonal shape in its cross section. FIG. 29 shows concrete examples. FIG. 29(a) shows an ordinary honeycomb member 1210a having a hexagonal shape in its cross section. FIG. 29(b) shows a corrugated core type honeycomb member 1210b. FIG. 29(c) shows a honeycomb member 1210c having a laminated structure of members each of which is subjected to dimple processing on one side thereof. A honeycomb member 1210d shown in FIG. 29(d) has a structure of members each of which is subjected to dimple processing on both sides thereof, and which are connected to each other at projected front ends d1. A honeycomb member 1210e shown in FIG. 29(e) has a structure of aluminum plates each of which is provided with a plurality of holes e1 having returns e2, and which are connected to each other at the return sections e2.

Other than the honeycomb member, it is also possible to use any material that can contribute to the improvement of thermal conductivity by combining this material with the resin 1106. For example, as shown in FIG. 29(f), a Raschig Ring 1210f as a heat conductor may be filled in the space 206, and the resin 1106 may be filled around this Raschig Ring 1210f. Further, as shown in FIG. 29(g), a demister 1210g made of aluminum may be fitted in the space 1206, and the resin 1106 may be filled around this demister. From the viewpoint of thermal conductivity, it is preferable that the size of each cell is as small as possible. However, it is not desirable that this size is so small that it is difficult to fill the resin 1106 in the cell.

The external surface shape of the sheet member 1210 may be other than these described above. For example, as shown in FIG. 30(a), the external surface of a sheet member 1220 may have a valley shape (a valley-shaped section 1221). Further, as shown in FIG. 30(b), two angular-shaped portions 1231 may be provided on the external surface of a sheet member 1230. Further, as shown in FIG. 30(c), the cross section of the external surface of a sheet member 1240 may have an arc shape (an arc section 1241). In addition to the shapes, it is also possible to use various kinds of angular-shaped portions or valley-shaped portions if the shapes have an increased heat radiation area.

It is preferable to form an obtuse angle θ at the angular-shaped portion 1207 or a valley portion 1208 that is formed on the external surface of the cask by providing the valley-shaped portion (corresponding to a joint of the sheet members when the angular-shaped portion is provided, and a valley portion when the valley-shaped portion is provided). With this arrangement, it becomes easy to carry out decontamination of the cask 1100.

A lid section 1109 is constructed of a primary lid 1110 and a secondary lid 1111. This primary lid 1110 is a disk made of stainless steel or carbon steel that shields the gamma ray. The secondary lid 1111 is also a disk made of stainless steel or carbon steel. A resin is sealed in the upper surface of this secondary lid as a neutron shield (not shown). The primary lid 1110 and the secondary lid 1111 are fixed to a body 1101 with bolts made of stainless steel or carbon steel. Further, metallic gaskets are proved between the primary lid 1110 and the secondary lid 1111 and the body 1101 respectively, thereby to hold air tightness in the inside. Trunnions 1117 are provided at both sides of the cask body to suspend the cask 1100. Buffers 1118 are fixed to both sides of the cask 1100 when the cask 1100 is transported.

The internal surface of the body 1101 has a shape that matches the external shape of a basket 1300 to be used. The external surface of the basket 1300 is in approximately close contact with the body 1101 (however, a fine gap may be produced in actual cases). It is not necessary to match the internal surface of the body 1101 with the external shape of the basket 1300 approximately completely. Instead, it is also possible to shape the internal surface such that a part of the external surface of the basket 1300 is not in contact with the internal surface. It is possible to suitably design a proportion between the two by taking thermal conductivity into account.

For the basket 1300, it is possible to use a structure of cells formed by combining angular pipes made of aluminum composite material or aluminum alloy obtained by adding powder of B (boron) or a B compound having a neutron absorbing function to powder of Al or an Al alloy. It is also possible to use a laminated structure of forging having cells (corresponding to the basket shown in FIG. 26 and FIG. 27), or to use a structure laminated in a shape of a box for cakes by crossing rectangular plates of aluminum composite material or aluminum alloy with slits. For the neutron absorber, it is possible to use cadmium in addition to boron. The basket 1300 according to this embodiment can accommodate 33 spent fuel assemblies (for PWR), but the number is not limited to 33. It is needless to mention that it is also possible to use the basket as a cask for BWR.

As the external shape of the basket 1300 becomes close to an octagonal shape, the internal surface of the body 1101 becomes approximately octagonal. Therefore, the external shape of the body 1101 is formed octagonal so as to face each surface. With this arrangement, the overall thickness of the body 1101 becomes approximately uniform, and there is no surplus thickness. Therefore, it is possible to reduce weight. Further, it is possible to secure the gamma-ray shielding performance within a necessarily sufficient range. The internal surface and the external surface of the body 1101 are machined using an exclusive machining unit. For details, refer to Japanese Patent Application Laid-open No. 11-249314 filed by the applicant of this application. While the shape of the body 1101 in this embodiment is octagonal, the shape is not limited to this. In other words, it is also possible to set the shape of the body 1101 to a decagon or a dodecagon so as to match the external shape of the basket 1300 (not shown).

For accommodating spent fuel assemblies in the cask 1100, the cask 1100 is sunk in the pool, and the spent fuel assemblies are accommodated under the water. Therefore, radioactive materials adhere to the periphery of the cask 1100. Consequently, it is necessary to remove the radioactive materials when the cask is lifted up from the pool. However, as the conventional cask 1500 has a structure that the comb-shaped fins 1504 are welded to the stripes 1502, a brush for removing the radioactive materials is hard to reach a root part of the fins, and shaded sections occur when the cask is cleaned with sprayed water. Therefore, there has been a problem of difficulty in the removal as it is necessary to clean thoroughly.

On the other hand, according to this embodiment, the cask as follows has been proposed. That is, the cask comprises the body 1101 internally provided with the basket 1300 where spent fuel assemblies are accommodated, and the sheet members 1201 provided around the body 1101, where a part of each of the sheet members 1201 is in contact with the body 1101, another part of the member constitutes an external surface of the cask 1100 and forms a single or plural angular-shaped portions 1207 (or valley-shaped portions), and still another part of the member is connected to the adjacent sheet member 1201, the resin 1106 is filled in the space 1206 structured by the sheet members 1201, and the angle formed at the joint of the sheet members 1201 becomes the obtuse angle θ.

As explained above, by setting the angle at the joint to the obtuse angle θ, for example, about 120 degrees as shown in FIG. 27, a brush for decontamination can reach all corners of the external surface of the cask. Therefore, it becomes possible to carry out the decontamination easily.

The spent fuel assemblies that are accommodated in the cask 1100 contain fissionable materials and fission products, and generate radiation with decay heat. Therefore, it is necessary to securely maintain the heat removing function, the shielding function, and the critical-state preventing function of the cask 1100 during the storage period. According to this cask 1100, the sheet members 1201 are provided around the body 1101, and the honeycomb member 1210 provided in the space 1206 formed with the sheet members 1201 and the sheet members 1201 that form the external surface of the cask 1100 are formed in angular shapes to expand a heat radiation area. With this arrangement, the decay heat produced from the spent fuel assemblies is conducted and radiated efficiently.

The decay heat produced from the spent fuel assemblies is conducted to the body 1101 through the basket 1300 or the filled helium gas. Next, the decay heat is conducted to the external surface of the cask 1100 through the sheet members 1201 having the function as internal fins and the honeycomb member 1210. Particularly, the honeycomb member 1210 is made of aluminum or copper having excellent thermal conductivity, and therefore the honeycomb member efficiently absorbs the heat from the body 1101, conducts this heat to the sheet members 1201, and radiates the heat to the outside from the external surface of the cask. From the above, as the decay heat can be efficiently removed, it is possible to keep the temperature inside the cask to a lower level than a conventional example when the decay heat quantity is the same.

The gamma ray generated from the spent fuel assemblies is shielded by the body 1101, the sheet members 1201, and the lid section 1109 that are made of carbon steel or stainless steel. Further, neutron is shielded by the resin 1106, thereby to avoid the influence of exposure to radiation operators. Specifically, it is designed to obtain a shielding function such that a surface dose equivalent rate is 2 mSv/h or below, and a dose equivalent rate at 1 m deep from the surface is 100 μSv/h or below. Further, the aluminum alloy containing boron is used for the basket 1300, and therefore it is possible to prevent the spent fuel assemblies from reaching a critical state by absorbing neutrons.

According to the cask 1100 of this embodiment, the sheet members 1201 are fixed to the body 1101, the angular-shaped portions 1207 are provided at sections forming the external surface of the cask out of the sheet members 1201, and the aluminum-made honeycomb member 1210 is filled into the space 1206 formed with the sheet members 1201. Therefore, it is possible to improve the efficiency of conducting the decay heat. Further, according to the cask 1100 of this embodiment, it is not necessary to weld the plurality of fins 1504 onto the external surface like the conventional practice. Therefore, there is an advantage that it does not require much labor in the manufacturing. While the cask 1100 accommodates the spent fuel assemblies, it is needless to mention that the cask can accommodate other radioactive materials.

Figure 31:
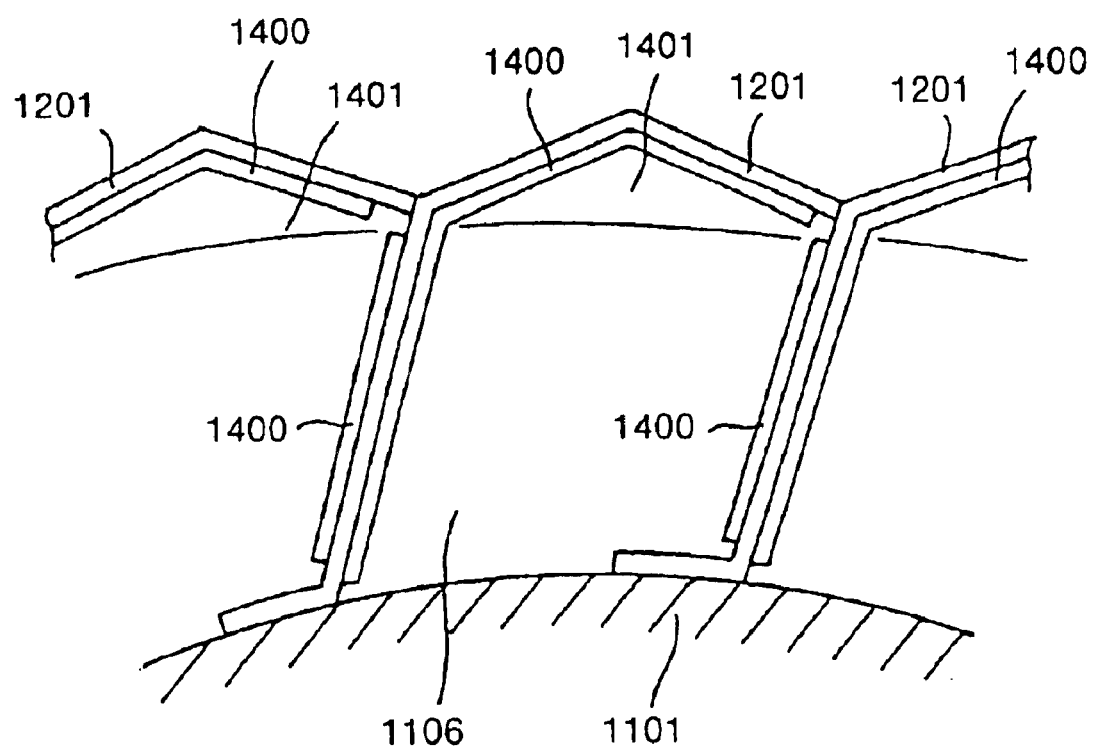
FIG. 31 is an explanatory view which shows a modification of this cask.
Figure 32:
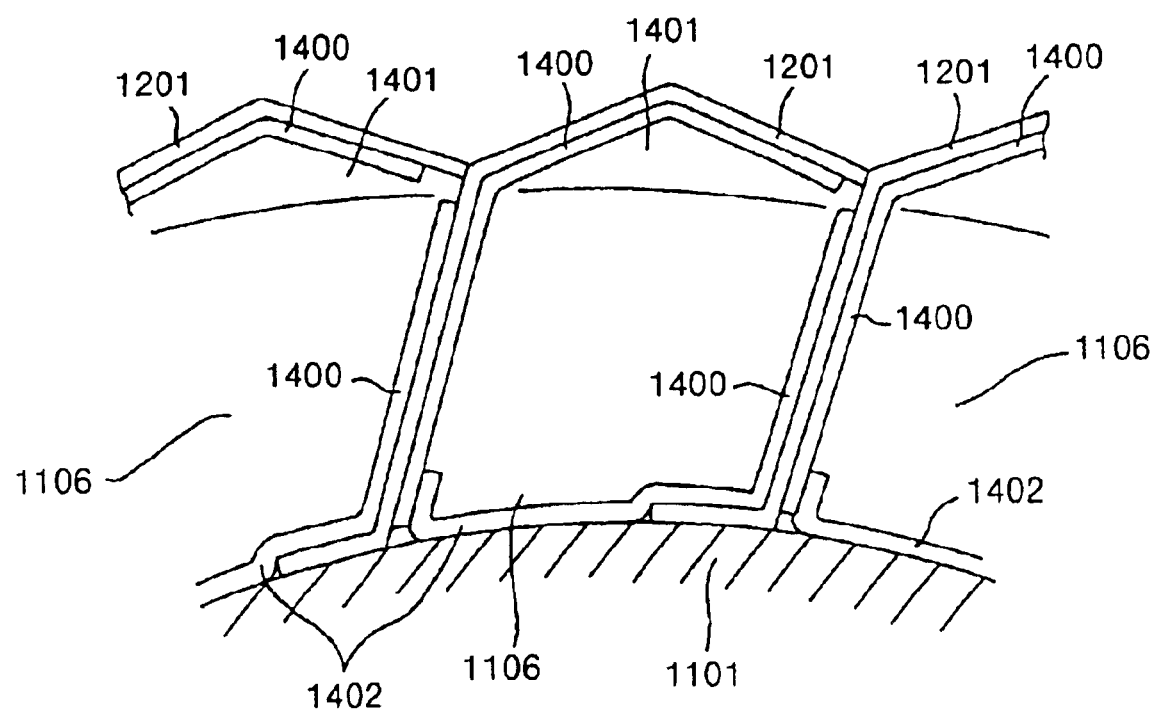
FIG. 32 is an explanatory view which shows the modification of the cask shown in FIG. 31.

FIG. 31 shows a modification of this embodiment. According to this cask, the sheet members 1201 made of carbon steel are provided around the body 1101. A heat-conductive plate 1400 consisting of an aluminum plate (or a copper plate or a graphite sheet) is adhered to both sides of the sheet member 1201. Only a resin 1106 is filled in the space formed with the sheet members 1201. An allowance for expansion 1401 is formed between the external side of the resin 1106 and the sheet member 1201 (not shown). The aluminum plate 1400 may be provided on only a single side of the sheet member 1201. Further, in order to increase the heat collection efficiency, the heat-conductive plate 1400 may be extended (an extension section 1402) and brought into surface contact with the body 1101 as shown in FIG. 32. In this case, as heat is conducted efficiently from the extension section 1402 to the heat-conductive plate 1400, it is possible to keep the temperature of the resin 1106 at a low level. Therefore, it is possible to prevent deterioration in the quality of the resin 1106.

In the above structure, the heat-conductive plate 1400 (including the extension section 1402 of the heat-conductive plate in the case of FIG. 32) conducts the main decay heat. Even if the honeycomb member 1210 is used, the heat-conductive plate 1400 can be adhered to the sheet member 1201. With this arrangement, it is possible to further improve the thermal conductivity of the cask.

Figure 33:
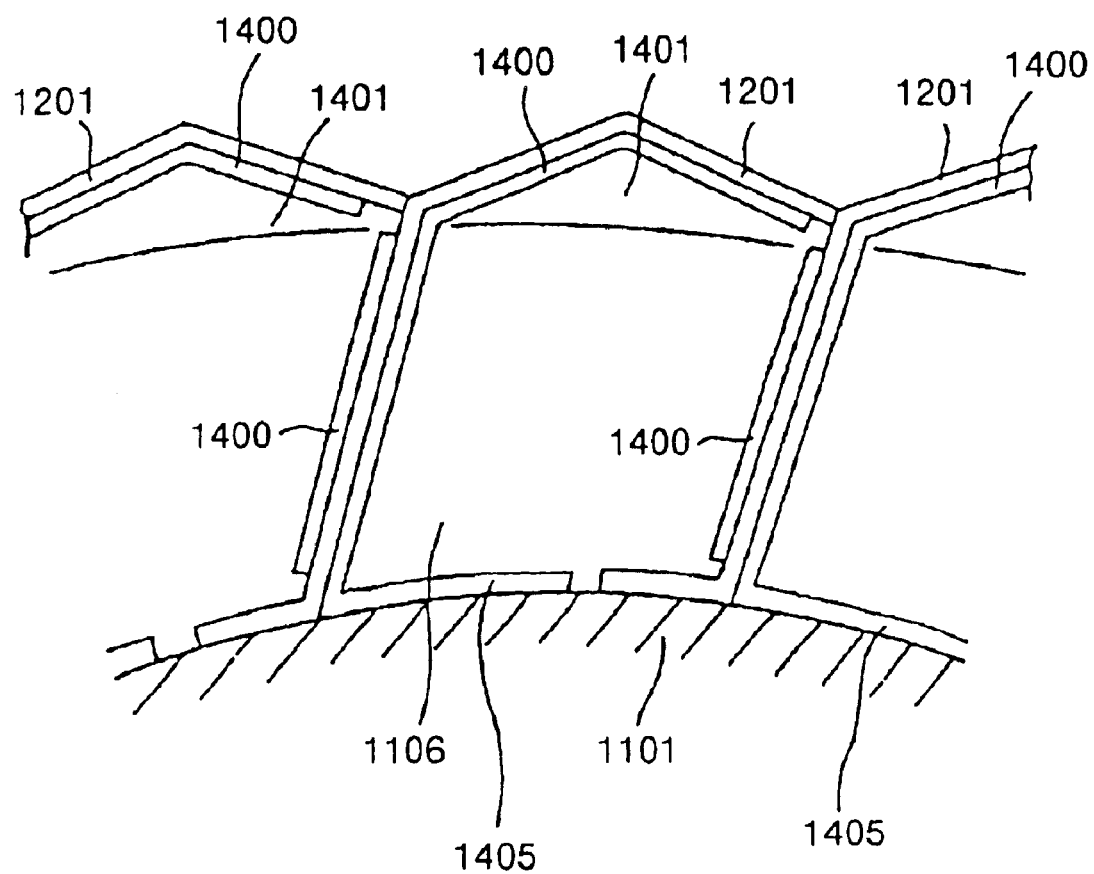
FIG. 33 is an explanatory view which shows the modification of the cask shown in FIG. 31.

The shape of the heat-conductive plate 1400 is not particularly limited. For example, as shown in FIG. 33, an extension section 1405 maybe provided so as to be extended to the body 1101. According to this structure, the efficiency of collecting heat from the body 1101 is further improved, and it is possible to keep the temperature inside the resin 1106 and the body 1101 at a low level.

Figure 34:
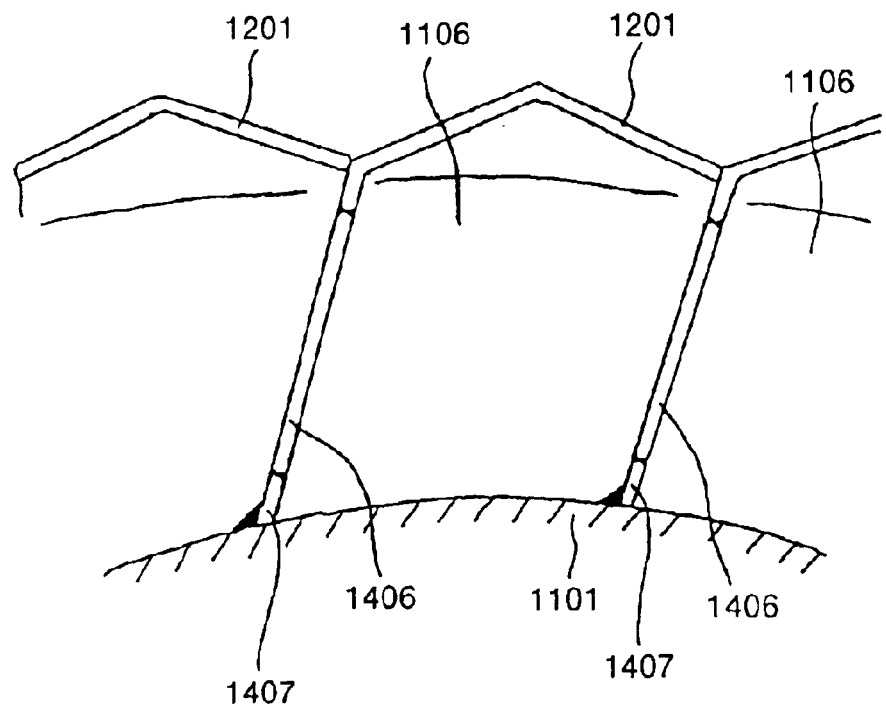
FIG. 34 is an explanatory view which shows the modification of the cask shown in FIG. 31.
Figure 35:
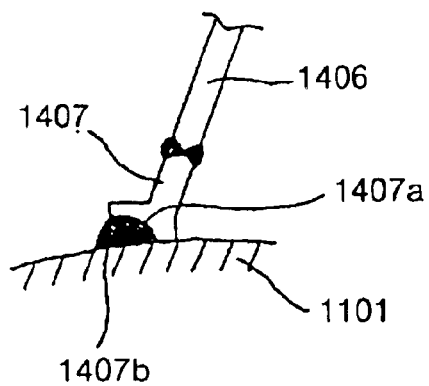
FIG. 35 is a partially enlarged view of the view shown in FIG. 34.

As shown in FIG. 34, it is also possible to provide an intermediate member 1406 that is a part of the sheet member 1201 made of iron or the like having high heat resistance, in the section filled with the resin 1106. A heat-conductive plate like an aluminum plate or a copper plate is used for the intermediate member 1406. Further, it is preferable to use a material that can be easily welded to the body 1101, for a fitting section 1407 with the body 1101. The material includes, for example, the carbon steel or stainless steel that is the same material as that used for the body 1101. The sheet member 1201, the intermediate member 1406, and the fitting section 1407 are welded in advance at some other place at a pre-stage of executing the welding to the body 1101. Friction stirring welding or TIG welding is used for the welding. FIG. 35 is a partially enlarged view of FIG. 34. The end of the fitting section 1407 is formed with an angled edge 1407a for the welding. With this arrangement, it is possible to increase the contact area with the body 1101 according to a welding bulge portion 1407b. Therefore, heat conduction improves.

Figure 36:
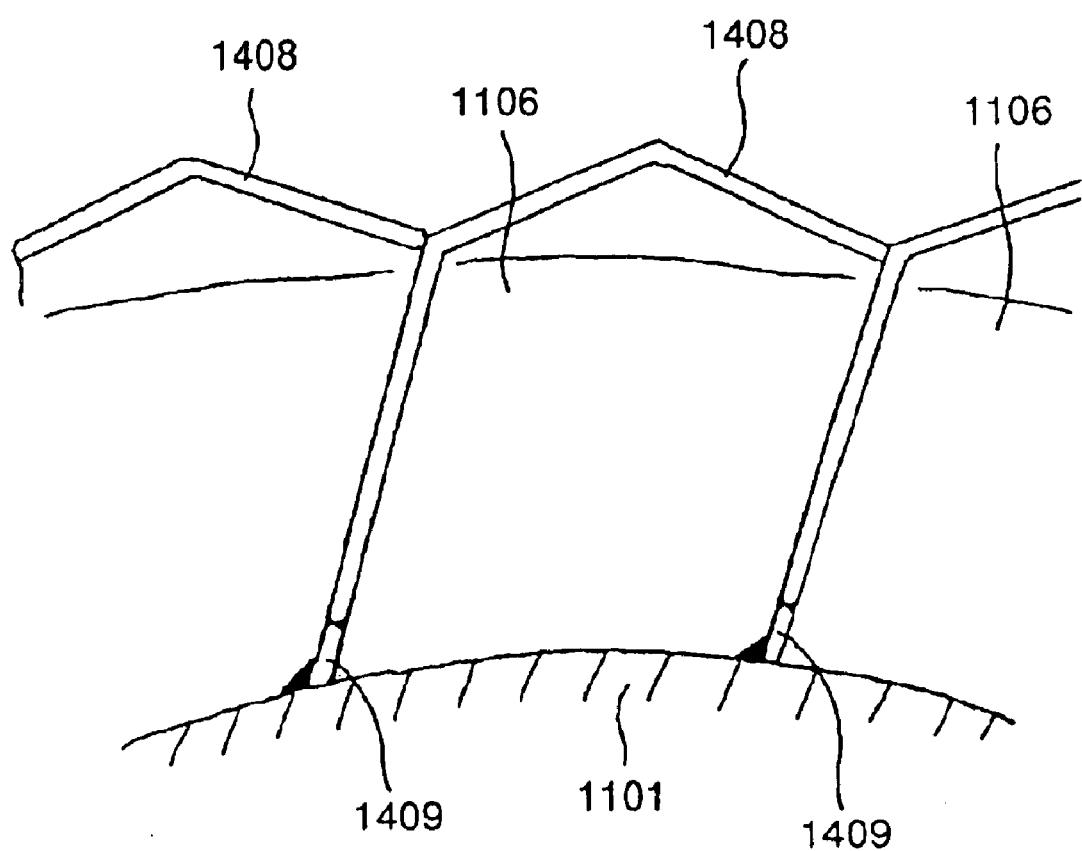
FIG. 36 is an explanatory view which shows the modification of the cask shown in FIG. 31.

FIG. 36 shows another modification. For a sheet member 1408, an aluminum member having the function as a heat conductor that is the same as the intermediate member 1406 is used. Further, a fitting section 1409 with the body 1101 is provided at the end of this sheet member 1408. For the fitting section 1409, it is also preferable to use a material that can be easily welded to the body 1101. In this structure, a heat conductor like an aluminum material forms an external cylinder of the cask 1100. Therefore, heat movement is excellent. Based on the structure using the aluminum material, it is possible to reduce the weight of the cask 1100. Such a structure has low requirement for heat resistance, and is therefore suitable for a container exclusive for storage.

Figure 37:
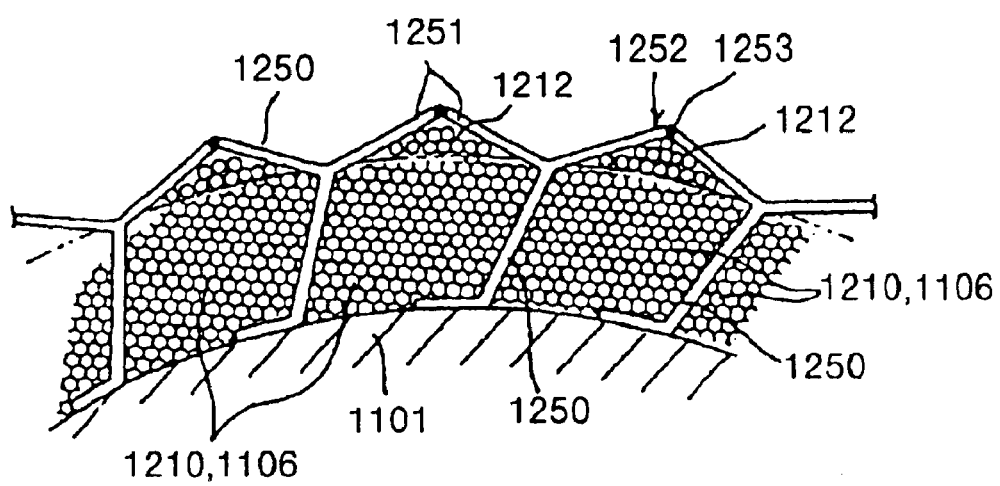
FIG. 37 is an explanatory view which shows a modification of the sheet members.

The shape of the sheet member 1408 is not limited to the one shown in FIG. 36. For example, as shown in FIG. 37, a sheet member 1250 having a Y shape in its cross section may be used. This sheet member 1250 can be formed by bending or extrusion. In the case of this sheet member 1250, its leg is welded to the body 1101, and both edges are connected to edges 1251 of adjacent sheet members 1250. Based on this, the sheet members 1250 form heat conductive fins and an external surface of the cask 1100. In this case, welded joints 1253 are positioned at a ridgeline of an angular-shaped portion 1252. When the strength of the welded joints 1253 becomes low, the welded joints 1253 may be positioned in the middle of the angular-shaped portion 1252 (not shown).

As shown in FIG. 38(*a*), a plurality of umbrella-shaped sheet members 1260 may be used to form a cask having valley-shaped portions 1261. Further, as shown in FIG. 38(*b*), the external surface of a sheet member 1270 having a T shape in its cross section is formed in a wave shape (a wave-shaped portion 1271), and its edges 1272 are connected to the edges of adjacent sheet members 1270. With this arrangement, it is also possible to obtain the same effect as the above. These sheet members 1260 and 1270 may be formed by sheeting or may be molded by extrusion.

INDUSTRIAL APPLICABILITY

As explained above, according to the cask and the method of manufacturing the same of the present invention, it is possible to obtain the cask that is easily assembled and has high thermal conductivity. Therefore, the cask is suitable for accommodation of the spent fuel assemblies.

What is claimed is:

1. A cask comprising a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder, wherein the external cylinder has a structure that a plurality of first and second belt-like members are welded along edges of the members, the heat conductive fins are welded along both sides of one first belt-like member with a margin left along edges of the both sides, and a second belt-like member adjacent to the first belt-like member is welded near the respective edges.

2. The cask according to claim 1, wherein the belt-like member is formed in an angular shape or a valley shape by bending.

3. The cask according to claim 2, wherein the heat conductive fin is fixed diagonally with respect to a radial direction of the cask.

4. The cask according to claim 1, wherein the heat conductive fin is bent in an L shape or a U shape in its cross section, and is in surface contact with the bolt-like member.

5. The cask according to claim 1, wherein the adjacent belt-like members are coupled to each other along ends of the members.

6. The cask according to claim 1, wherein for welding the heat conductive fins to the body made of steel, a bulge portion made of iron is provided on the body, and the heat conductive fin made of copper is welded to the bulge portion.

7. A cask comprising a body that accommodates a basket formed with a plurality of cells where spent fuel assemblies are accommodated, with a plurality of heat conductive fins provided around an external periphery of the body, an external cylinder fixed to an external periphery of the heat conductive fins, and a neutron absorber provided in a space formed with the heat conductive fins and the external cylinder, wherein the external cylinder has a structure that first and second belt-like members are welded along edges of the members, a unit is structured by welding the heat conductive fins along both sides of one first belt-like member with a margin left along edges of the both sides, the unit is welded to the body with the heat conductive fins from the outside of the unit and is arranged at predetermined intervals, and a second belt-like member is covered over a gap between the first belt-like members of adjacent units and is welded from the outside.

8. The cask according to claim 7, wherein the belt-like member is formed in an angular shape or a valley shape by bending.

9. The cask according to claim 8, wherein the heat conductive fin is fixed diagonally with respect to a radial direction of the cask.

10. The cask according to claim 7, wherein the heat conductive fin is bent in an L shape or a U shape in its cross section, and is in surface contact with the belt-like member.

11. The cask according to claim 7, wherein the adjacent belt-like members are coupled to each other along ends of the members.

12. The cask according to claim 9, wherein for welding the heat conductive fins to the body made of steel, a bulge portion made of iron is provided on the body, and the heat conductive fin made of copper is welded to the bulge portion.

* * * * *